United States Patent [19]

Games et al.

[11] 4,205,381

[45] May 27, 1980

[54] ENERGY CONSERVATIVE CONTROL OF HEATING, VENTILATING, AND AIR CONDITIONING (HVAC) SYSTEMS

[75] Inventors: John E. Games, Granby; William W. Bitterli, Simsbury, both of Conn.; David M. Healey, Feeding Hills, Mass.

[73] Assignee: United Technologies Corporation, Hartford, Conn.

[21] Appl. No.: 829,379

[22] Filed: Aug. 31, 1977

[51] Int. Cl.² .................. F24F 3/00; G06F 15/46
[52] U.S. Cl. ........................ 364/505; 165/16; 165/22; 165/26; 364/118
[58] Field of Search ........... 364/118, 505; 318/609, 318/, 610; 165/12, 13, 16, 22, 26, 30; 236/1 B, 1 C, DIG. 8

[56] References Cited

U.S. PATENT DOCUMENTS

| | | | |
|---|---|---|---|
| 3,826,305 | 7/1974 | Fishman | 165/26 |
| 3,834,617 | 9/1974 | Dyntar | 236/1 C |
| 3,949,807 | 4/1976 | Tyler | 165/16 |
| 3,951,205 | 4/1976 | Zilbermann | 165/22 X |
| 3,979,922 | 9/1976 | Shavit | 165/16 X |
| 4,013,118 | 3/1977 | Zimmer et al. | 165/22 |

*Primary Examiner*—Jerry Smith
*Attorney, Agent, or Firm*—Dominic J. Chiantera

[57] ABSTRACT

Electronic processing means, in combination with dedicated sensing apparatus is used to control the operation of an HVAC system which regulates the temperature in one or more temperature controlled spaces. The electronic processing means and associated sensing apparatus being readily adapted to existing HVAC systems through interface apparatus installed in each of the existing HVAC control lines associated with the HVAC sources of mixed air, hot air, and cold air, to provide selective actuation and modulation of the discharge air temperature from each source, individually or in combination, in response to sensed HVAC parameters including source discharge temperatures, space temperatures, outside air temperature, and the relative humidity of the outside air and return air from the spaces.

6 Claims, 11 Drawing Figures

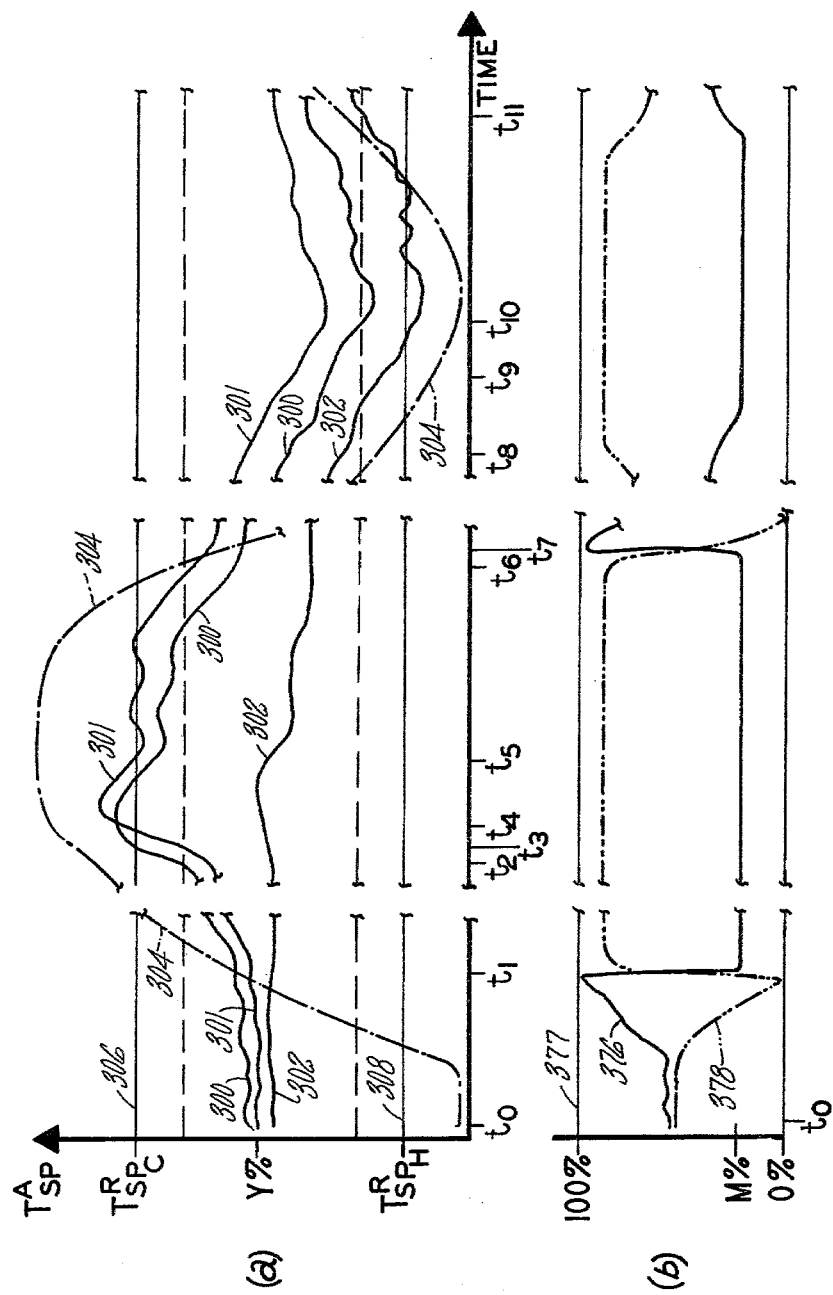

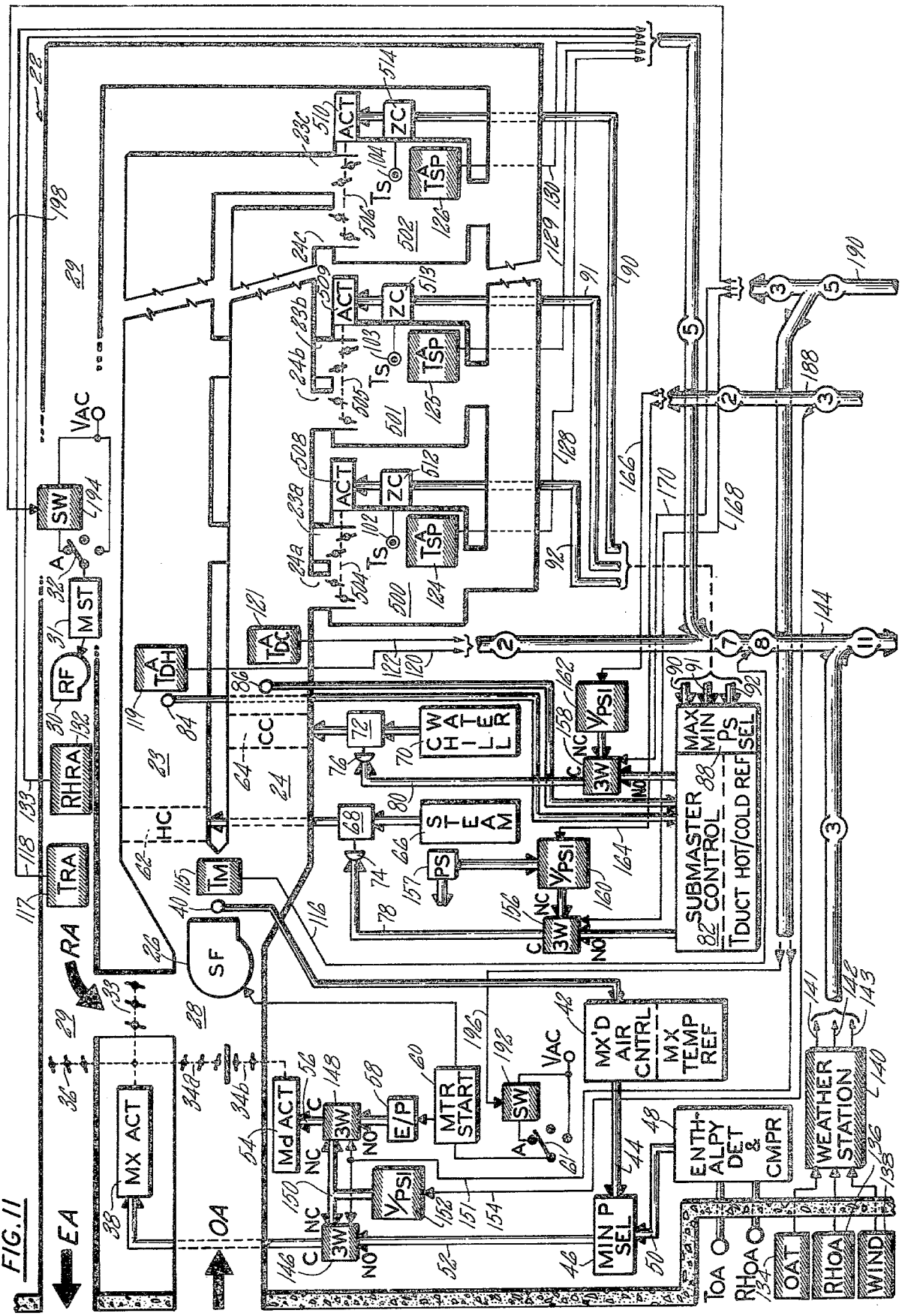

ENERGY CONSERVATIVE CONTROL OF HEATING, VENTILATING, AND AIR CONDITIONING (HVAC) SYSTEMS

BACKGROUND OF THE INVENTION

1. Field of Invention

This invention relates to automatic control of heating, ventilating, and air conditioning (HVAC) systems and more particularly to automatic control of HVAC systems to reduce both the energy required for system control and the actual energy consumption required for maintaining desired environmental temperature conditions.

2. Description of Prior Art

As may be known, HVAC systems are used for controlling the environmental temperature conditions in one or a plurality of structurally enclosed living spaces, i.e. those spaces inhabited by humans. In general such HVAC systems include separate sources of heating and cooling which may be individually ducted to the temperature controlled space. The ducting systems are varied and include among others, systems having individual hot and cold ducts communicating directly with each of the controlled spaces through space dampers which are thermostatically controlled at the space site to modulate the amount of hot and cold air discharged into the space. Such systems generally include a source of conditioned return air from the spaces in addition to outside fresh air, the return air and outside air being modulated to provide a mixed air supply which is forced through the heating and cooling sources within the respective hot and cold ducts. An HVAC system of this type is shown and described in a U.S. Pat. No. 4,013,118 to Zimmer et al, wherein the amount of heating and cooling provided in the hot and cold ducts are determined by the highest heat and cold demand space (referred to by Zimmer as zones) among the plurality of spaces being controlled. The mixed air temperature is controlled by dampers located within respective outside air and return air ducts which are inversely positioned in response to the deviation of a sensed mixed air temperature from a selected set point. In operation this system receives signals representative of the space temperature error in the worst case hot and cold spaces and compares the signal magnitudes with fixed duct reference temperatures to provide corresponding heat and cool demand signals which turn on sequential heating and cooling stages.

A similar multi-zone temperature control system is shown and described in U.S. Pat. No. 3,901,310 to C. S. Strawn. As with the patent to Zimmer et al the system of Strawn controls hot and cold deck temperatures in response to the hottest and coldest of the plurality of zones, and controls the various zones to a selected reference temperature within each zone provided by the setting of a zone thermostat.

A more recent HVAC control for a multi-zone, or multi-space system is disclosed in U.S. Pat. No. 3,949,807 to H. J. Tyler in which the temperature within each of a plurality of individual spaces is maintained with hot and cold ducted air supplied from heating and cooling sources, each controlled by a master controller as in the systems disclosed by Zimmer et al and Strawn. The control system of Tyler, however, provides each of the controlled spaces with heat and cool set point temperatures separated by a temperature deadband. Mechanical heating or cooling is provided only in response to a proportional error representative of the deviation of the worst case temperature space above or below the corresponding cool or heat set point, and the degree of heating or cooling is controlled by a fixed proportional gain control loop. For the condition in which all space temperatures are within the temperature deadband, the control system modulates the outside air and return air dampers through a straight proportional gain, mixed air temperature control loop to obtain the required mixed air temperature within the hot and cold decks necessary to maintain the plurality of space temperatures to a fixed space temperature set point at one end of the temperature deadband closest to the heat set point temperature, so long as the outside air enthalpy is within prescribed limits. The mixed damper position signal is similarly proportional to the deviation of the space from the mean mixed air temperature air reference, and the mixed air dampers are modulated from a minimum open position to a full open position in response to less than one degree of space temperature error. The control system of Tyler provides a measure of energy conservation in that the hottest and coolest spaces cannot control activation of the mechanical heating air cooling until such spaces have exceeded the temperature deadband set points, however, once activated the system provides proportional control of the mechanical heating and cooling in the same way as the prior systems.

As may be known, a proportional control system requires an ever present temperature error signal, i.e. "droop error" to provide the necessary output error signal to control the associated heating or cooling sources (steam or chill water generators). The magnitude of the error signal is equal to the difference temperature between the actual and reference duct temperatures divided by the proportional gain constant, and the signal magnitude limit cycles about a mean value between the actual and duct reference values, such that the magnitude of the "droop error" is dependent on the magnitude of the proportional gain. Small values of proportional gain result in a large "droop error" and the larger the magnitude of the proportional gain the more severe the limit cycle amplitude of the error signal due to the inherent time lags and thermal response of the system. Typical peak to peak limit cycle temperature amplitudes of 20° are common, such that the duct temperature may limit cycle between 55° and 75° in an attempt to maintain a mean duct temperature of 65°. In addition to the obvious waste of control energy in cycling the heating or cooling source through these temperature extremes, the actual energy consumption of the heating and cooling sources required to maintain space temperature is similarly increased.

SUMMARY OF THE INVENTION

An object of the present invention is to provide improved HVAC system control in such a manner as to reduce the actual energy consumption of the HVAC in providing temperature regulation in the controlled spaces.

According to the present invention, an electronic processor responsine to dedicated sensing apparatus providing sensed signals representative of a plurality of HVAC parameters including source discharge temperatures, space temperatures, outside air temperatures, and relative humidity of the outside air and the return air from the spaces, successively samples and registers the sensed signals in memory and provides therefrom calculated source reference discharge temperature signal for each of the HVAC sources of mixed air, hot air, and cold air, the reference signals being presented to each source through interface apparatus installed in the existing HVAC control lines to each source, the processor modulating each source discharge temperature in response to difference temperature values between the source reference discharge temperature and successively sampled values of the actual sensed discharge temperature. In further accord with the present invention, heat and cool set point temperature values are registered in the processor, the set point reference temperatures establishing a temperature drift band therebetween, the electronic processor providing source reference discharge temperature signals to the HVAC hot air source and cold air source in response to sensed space temperature values outside of the temperature drift band, each reference discharge temperature signal having a magnitude equal to the temperature difference between the respective heat and cool set point temperature values and the coldest and hottest sensed space temperature values outside of the drift band, each multiplied by a proportional plus integral gain constant, each gain constant having values selectable in dependence on the characteristics of the associated cold and hot sources. In still further accord with the present invention, the electronic processor provides actuation of the corresponding hot and cold sources in response to a sensed space temperature value below or above the corresponding heat or cool set point temperature and provides a shut off of the sources at all other times. In still further accord with the present invention, in the absence of hot or cold source actuation the processor provides a reference discharge temperature value for the source of mixed air at a magnitude equal to the temperature difference between the hottest sensed space temperature and a mixed air set point temperature value within the temperature drift band, multiplied by a proportional plus integral gain constant, the electronic processor presenting the reference value to the source of mixed air to provide position modulation of the source dampers in response to the magnitude thereof.

In still further accord with the present invention, the space heat, cool, and mixed air set points and the values of the proportional and integral gain constants used in the calculation of the reference discharge temperatures for each of the sources of mixed air, hot air, and cold air are registered in the electronic processing means and are instantly changeable by a central operator in response to changes in the operating conditions of the HVAC system, or in response to changes in ambient conditions due to season, day of the week or time of day.

The improved HVAC control of the present invention utilizes a combination of proportional plus integral gain in providing the reference discharge temperatures used in controlling the modulation of the HVAC sources of mixed air, hot air, and cold air. The combination of proportional plus integral gain allows for both quick system response to changes in space temperatures, in addition to the elimination of the "droop error" through the use of the integral gain function which allows a zero set point error in the steady state.

The foregoing and various other objects, features and advantages of the present invention will become more apparent in the light of the following detailed description of exemplary embodiments thereof, as illustrated in the accompanying drawing.

DESCRIPTION OF THE DRAWING

FIG. 5 is an illustration of operating waveforms used in the description of the control of the HVAC system of FIG. 1 in accordance with the present invention;

FIG. 11 is a schematic block diagram of another type of HVAC system together with installed interface apparatus for both control and sensing of performance of the HVAC system in accordance with the present invention.

DESCRIPTION OF THE PREFERRED EMBODIMENT

Figure 4:
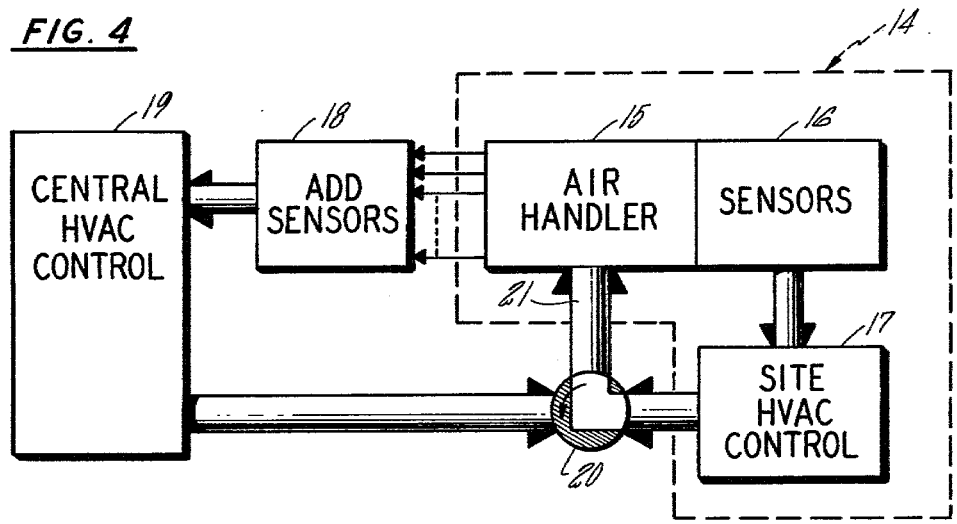
FIG. 4 is a simplified block diagram of the control system of the present invention.

The HVAC system control of the present invention is added directly to an existing, installed HVAC system or as an addition to a new system, and provides centralized, direct digital control over the total HVAC system operation through a plurality of interface control and parameter sensing apparatus. The present control system is selectably activated by maintenance personnel and when deactivated restores total system operation to the existing HVAC control loops. Referring first to FIG. 4, in a typical HVAC system 14 the operation of an airhandler 15 is monitored by a plurality of sensors 16 which provide sensed parameter information, such as deck discharge temperatures, space temperatures, and outside air temperature and enthalpy conditions, to a site HVAC control 17 which responds by providing control signals to the airhandler to control energizing of heating and cooling sources, and control of mixed air and space damper positions. In accordance with the present invention, new sensors 18 are installed which provide both redundant sensing of selected parameters in addition to new sensed parameters, and provide the sensed information to a central HVAC control 19. Interface apparatus 20, which is selectably operable in either of two operating states, is installed into the various lines comprising the control loop of the site HVAC control 17 to permit selectable control over the airhandler by either the site control 17, or the central control 19, through existing airhandler control lines 21.

As described in detail hereinafter, the central HVAC control 17 provides direct digital control over the airhandler 13 when central control is selected. In a preferred embodiment, the central controller includes a digital, central processing unit (CPU) which may be located at some distance from the facility or building in which the HVAC system is installed, in combination with a remote microprocessor (RMP) installed at the building site in close proximity to the HVAC. The RMP provides signal conditioning and storage of the sensed parameter signals from the sensors 16 in addition to providing data compacting and front end processing of the sensed signals prior to presentation to the CPU. The RMP transmits the sensed data to the CPU on request. The CPU compares the sensed signal information with stored values and computes command reference signals, including hot and cold deck reference discharge temperatures using programmed proportional and integral gain constants whose values may be reprogrammed to accommodate changes in HVAC operating conditions. The reference signals are transmitted back to the RMP which compares each reference value with the actual sensed value of the parameter to provide inner loop, proportional gain control over the associated control device within the HVAC system, i.e. the system heating and cooling valves, or the damper actuators. The result of the combination of CPU and RMP control is an inner loop proportional control over the airhandler performance provided by the RMP, and an outer loop proportional plus integral control provided by the CPU.

Figure 1:
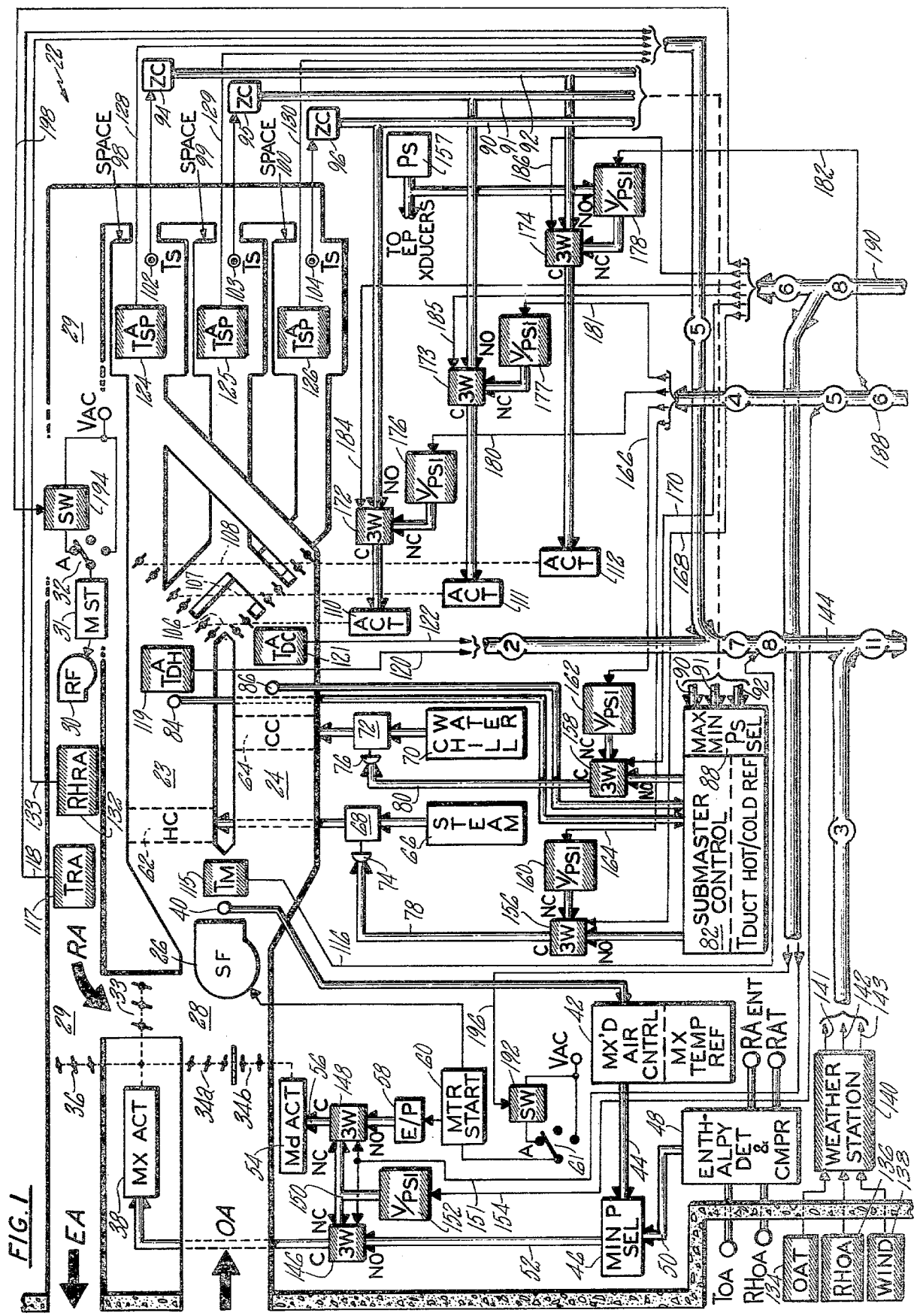
FIG. 1 is a schematic block diagram of an HVAC system with installed interface apparatus for both control and sensing of HVAC performance in accordance with the control system of the present invention.

Referring now to FIG. 1, in a typical prior art multizone type of HVAC system 22, an airhandler includes a hot deck 23 and cold deck 24 each provided with airflow from a system supply fan (SF) 26 which forces mixed air from a chamber 28 through the two decks. The chamber 28 receives conditioned return air (RA) from the temperature controlled spaces through a return air deck 29. In some systems the RA is forced through the duct by a return air fan (RF) 30 under the control of a motor start circuit 31 and manually operated switch 32, and is presented to the chamber 28 through an RA damper 33. The chamber 28 also receives outside air (OA) presented through OA dampers $34_a$, $34_b$. The dampers $34_a$, 33 and a set of exhaust air (EA) dampers 36 are position controlled by a pneumatic, mixed air damper actuator 38, which typically may comprise three separate actuators, one for each damper set, which are pneumatically synchronized such that the position of the dampers $34_a$ and 33 are inversely proportioned, whereas the position of the dampers $34_a$ and 36 are directly proportioned. The dampers $34_b$ are the minimum OA dampers which provide, when opened, a determined minimum percentage of OA to the HVAC living spaces. In the prior art systems, the dampers $34_b$ are not position modulated, but are either opened fully, or to some manually adjustable percentage of full open, whenever the supply fan 26 is on and full closed when the fan is off, without consideration to the occupancy status of the living spaces.

The actuator 38 provides position control of the dampers $34_a$, 33 to allow the air within the chamber 28 to include 100% OA, a combination of RA and some minimum OA, or any proportional ratio therebetween. The mixture of air within the chamber 28 is determined by a proportional gain closed loop control which includes a sensor 40 which presents the discharge air from the chamber 28 to a mixed air controller 42, which compares the sensed temperature with a mixed air temperature reference and generates a pneumatic error signal proportional to the difference therebetween. The error signal is presented through a pneumatic line 44 to a minimum pressure selector 46 which compares the signal on line 44 with the signal provided through an OA enthalpy detector 48. The enthalpy detector 48 provides an inhibit to the mixed air control loop by providing a minimum pressure signal on the line 50 in response to an OA enthalpy greater than the inside enthalpy which makes use of the OA undesirable. The selector 46 presents the minimum pressure signal from the line 50 through a line 52 to the actuator 38 which responds by closing damper $34_a$ and opening damper 33. In the absence of an inhibit signal on the line 50, the error signal on the line 44 is presented through the selector 46 and line 52 to the actuator 38, which responds to the error signal to provide a proportional positioning of the dampers $34_a$, 33 and 36 to attempt to achieve the desired mixed air temperature within the limitation of the droop error band.

The position of the minimum dampers $34_b$ is controlled by an actuator 54 in response to a discrete pneumatic signal on a line 56 which either causes the actuator to position the dampers in the open or full closed position. In the prior art HVAC system, the signal on the line 56 is provided directly from an electropneumatic (EP) transducer 58 which is responsive to an electrical signal from a motor start circuit 60 under the control of a manual switch assembly 61, and which indicates the energizing or deenergizing of the supply fan 26. The dampers $34_b$ are closed whenever the supply fan 26 is deenergized.

The hot and cold decks 23, 24 include respective heat and cool sources, such as a heating coil 62 and cooling coil 64. The heating medium for the heating coil 62 may be steam provided from a source 66 through a valve 68, and the cooling medium may be chill water presented from a source 70 through a similar type valve 72. The valves 68, 72 are controlled by pneumatic actuators 74, 76 each responsive to pneumatic control signals presented through lines 78, 80 from a submaster control 82, which provides position control of the valves 68, 72 from full closed to full open to attempt set control of the hot and cold deck discharge air temperatures monitored by sensors 84, 86. In a manner similar, if not identical, to that described in the hereinbefore referenced patents to Zimmer et al, Strawn, and Tyler, the controller 82 provides hot and cold deck reference temperatures by summing a fixed set point temperature reference, which is generally adjustable to a determined value within the controller at the HVAC site by an operator, with the product of the space temperature error and a determined proportional gain constant. Typically the control 82 responds to the hottest and coldest sensed space temperatures presented through a max/min pressure selector 88 which receives all of the sensed space temperatures on pneumatic lines 90-92 from individual space thermostats, (or controllers) 94-96. The thermostats 94-96 compare the sensed temperatures of spaces 98-100 provided by sensors 102-104, with the desired temperature set into the thermostat by the human occupant. The spaces 98-100 receive a mixture of hot and cold discharge air through associated pairs of dampers 106-108, each damper set including a hot damper and cold damper which are inversely positioned such that either full hot, full cold, or a proportional mixture of both is provided to the corresponding space. The dampers 106-108 are controlled by pneumatic actuators 110-112 in response to the error signals from thermostats 94-96 on the lines 90-92.

In the operation of the prior art HVAC system of FIG. 1, the selection of a desired, individual space temperatures results in a space temperature error presented through lines 90-92 to the actuators 110-112, and to the min/max pressure selector 88. The actuators 110-112 position the dampers in response to the space temperature error in an attempt to satisfy the desired space temperature selected. Through proper scaling of the magnitude of the pneumatic signal on the lines 90-92, a threshold level is established within the submaster control 82 such that the controller responds to the hottest and coldest sensed space temperature errors which exceed the respective threshold level, and provides the required change in hot or cold duct discharge temperatures. Typically the threshold levels are somewhat less than the full hot, or full cold error signal magnitudes such that the corresponding deck discharge temperature is changed to accommodate the space demand in advance of a saturation condition on the space control loops to provide optimum comfort levels within each of the spaces. As may be appreciated, the temperature differential between the hot and cool deck discharge temperatures may be substantial since each is dependent on the selected space temperatures which in turn are dependent on the whim of the occupant. This differential in deck discharge temperatures is directly proportional to energy consumption, and obviously to energy costs.

So far the description has been that of a multi-zone HVAC system of a type known in the art. In the HVAC control system of the present invention, the existing HVAC system is interfaced with the sensors and central control (16, 17 of FIG. 4) at selected control and sensed parameter locations. In FIG. 1 the added interface components are shown shaded for clarity of illustration and include, but are not limited to, the following components. Temperature sensors of a type known in the art such as resistance temperature sensors comprising ultraprecision nickel wire for measuring the temperature in the hot and cold decks and the indoor/outdoor free standing air over a typical temperature range of from $-40°$ to $+250°$ F., with a temperature coefficient of $+3$ ohms per degree F. The temperature sensors include a mixed air sensor ($T_M$) 115 connected to a line 116, a return air sensor ($T_{RA}$) 117 connected to a line 118, a hot deck discharge temperature sensor ($T_{DH}^A$) 119 connected to a line 120, a cold deck discharge temperature sensor ($T_{DC}^A$) 121 connected to a line 122, and space temperature sensors ($T_{sp}^A$) 124-126 connected to lines 128-130. The temperature sensors are located within the HVAC system generally as illustrated in FIG. 1. Further sensors include a return air, relative humidity sensor ($RH_{RA}$) 132 connected to a line 133, an outside air (OA) temperature sensor 134, an OA relative humidity ($RH_{OA}$) 136, and an OA average wind sensor ($W_S$) 138, the last three being mounted outside the building structure. The outside air temperature, relative humidity and average wind speed sensed signals are presented to a weather station 140 of a type known in the art, such as the Texas Electronics Series 3000 modular meteorological system, which provides the OA sensed signals on lines 141-143. The signal lines 116, 118, 120, 122, 128-130, 133 and 141-143 are presented through a conduit, or trunk line 144 to an input of the remote microprocessor (RMP), described hereinafter.

The control interface between the central control and the existing HVAC system is made by installing electropneumatic (EP) transducers in combination with three-way valves in the pneumatic control lines of the various HVAC system actuators and valves. The three-way valves are of the type well known in the art such as the Johnson Controls Model V24 and are selectably operable in one of two positions from a common (C) port to either a normally closed (NC) or a normally open (NO) port. Each three-way valve is installed in the corresponding pneumatic control line in such a manner as to provide connection of the existing pneumatic line between the C and NO ports, and the NC port is connected to the pneumatic output line of the EP transducer. The instantaneous position of the three-way valve is determined by the energizing of a solenoid within the valve assembly with a typical energizing voltage of 24 volts AC which is presented to the solenoid in response to the presence of a discrete energizing signal from the RMP. In the presence of a discrete energizing signal at the input of the three-way valve, a pneumatic pressure signal path is provided between the normally closed (NC) and common (C) ports, i.e. the output of the EP transducer and the input to the controlled device. This allows for a "fail safe" operation in that a failure in the RMP provides restoration of the three-way valve pneumatic signal path to the common and normally open (NO) ports restoring control to the existing HVAC system. The EP transducers are similarly of a type known in the art, such as the Hammeldahl Model T15. The transducers are charged from the existing system pressure source ($P_S$) to provide an operating pneumatic pressure signal in a typical range of 0-20 psi in response to an analog voltage signal from the RMP within a determined input analog voltage range.

The control of the HVAC mixed air is provided by installing three-way valves 146, 148 in the pneumatic control lines 52, 56 of the mixed air actuators 38 and min damper actuator 54 respectively. The C and NO ports are connected to the existing pneumatic lines as shown, and the discrete switching signal is presented to each valve on a line 151 from the RMP. The NC port of each valve is connected through a pneumatic line 150 to the pneumatic output of a common EP transducer 152 which receives an analog electrical signal input on the line 154 from the RMP. The two actuators are driven with the common pneumatic signal from the transucer 152. Typically, the min dampers 34$_b$ provide approximately twenty-five percent of the total OA flow when full opened, the dampers 34$_a$ providing the remaining flow. Depending upon the particular HVAC system, each damper set may respond in tandem to a different range of pressure signals within the 0 to 20 psi range (i.e. a min damper range of 3 to 8 psi and a max damper range of 8 to 13 psi), or may overlap such that each responds simultaneously to a common portion of the total pressure range (min damper range of 3 to 10 psi and max damper range of 3 to 13 psi). Although not shown due to drawing limitations, the EP transducer 152 is connected to the system pressure source ($P_S$) 157 (shown in the right-hand side of FIG. 1).

Control of heating and cooling coils 62, 64 is provided by installation of three-way valves 156, 158 in the pneumatic control lines 78, 80 to the steam and chill water valves 68, 72. The three-way valves are again installed with the existing pneumatic line connected to the C and NO ports. The NC ports of the valves 156, 158 are connected to the pneumatic output of the EP transducers 160, 162 which are connected to the source $P_S$ 157, and which receive input analog voltage signals from the RMP on the lines 164, 166, respectively. The three-way valves 156, 158 are selectably operable in dependence on a discrete voltage signal presented through associated lines 168, 170 from the RMP, each having its own discrete signal input to provide flexibility in control over either or both the heating coil and cooling coil. It should be noted that in certain types of HVAC systems, the steam and chill water valve actuators 74, 76 are driven from a common pneumatic line, each responding to a different portion of the total psi range. In such systems, the central control of the present invention would interface with the actuators through a common EP transducer and three-way valve.

In the multi-zone type of HVAC system of FIG. 1, the space dampers 106–108 and actuators 110–112 are physically located in close proximity to the heating and cooling coils within the building equipment room, such that control over the actuators is practical, and interface is made by installing three-way valves 172–174 in the pneumatic lines 90–92 respectively. The three-way valves are connected into the lines as described hereinbefore, and each are connected at the NC port to a corresponding one of EP transducers 176–178 which receive analog electrical input signals from the RMP on lines 180–182 respectively. The discrete energizing signals are presented to the corresponding valves 172–174 on lines 184–186. The analog signals to the EP transducers on the lines 154, 164, 166, 180, 181 and 182 are presented from the RMP on a common trunk line 188. Similarly the discrete voltage signals on the lines 151, 168, 170, and 184–186, are presented from the RMP on common trunk line 190.

In addition to the sensors and interface control apparatus described hereinbefore, control over the operating state of the supply fan 26 and the return fan 30 are provided through selectably operable voltage controlled switches 192, 194 of a type known in the art which provide a double throw equivalent function, and when energized provide electrical connection between the voltage source $V_{AC}$ and a selectable automatic (A) contact position of the switches 32, 61. The switches 192, 194 are controlled through discrete gate signals provided on the lines 196, 198 respectively which are also included in the common trunk line 190 from the RMP.

The interface apparatus shown in FIG. 1 is not necessarily inclusive, such that additional interface and sensing apparatus may be provided as deemed necessary. The interface apparatus shown in FIG. 1 represents the minimum required to provide control of the HVAC multi-zone system according to the present invention.

As stated hereinbefore, the HVAC control system of the present invention provides both inner loop control, i.e. the actual positioning of the heating coil or cooling coil valve positions when on heat or cool control, and the positioning of the mixed air dampers when on mixed air control, through the RMP which compares the sensed system temperatures with reference temperature values provided through outer loop computations performed in the CPU. The RMP provides signal conditioning and analog-to-digital transformation of the analog sense signals, storage of the sensed signal values in a random access memory (RAM) of the RMP between update intervals, and reads out a selected one or all of the stored parameter values to the CPU upon request. All of the functions performed by the RMP may be provided in the CPU itself, however, the use of a small RMP to provide front end data processing and interim storage, in addition to providing direct control of the various dampers and valve positions, is preferred since it allows a freeing up of the CPU, which reduces the actual computer time and allows the CPU to perform other tasks. Although the use of an RMP in combination with the CPU is preferred, its use is dependent upon the particular implementation of the present invention and may be found to be unnecessary.

Figure 2:
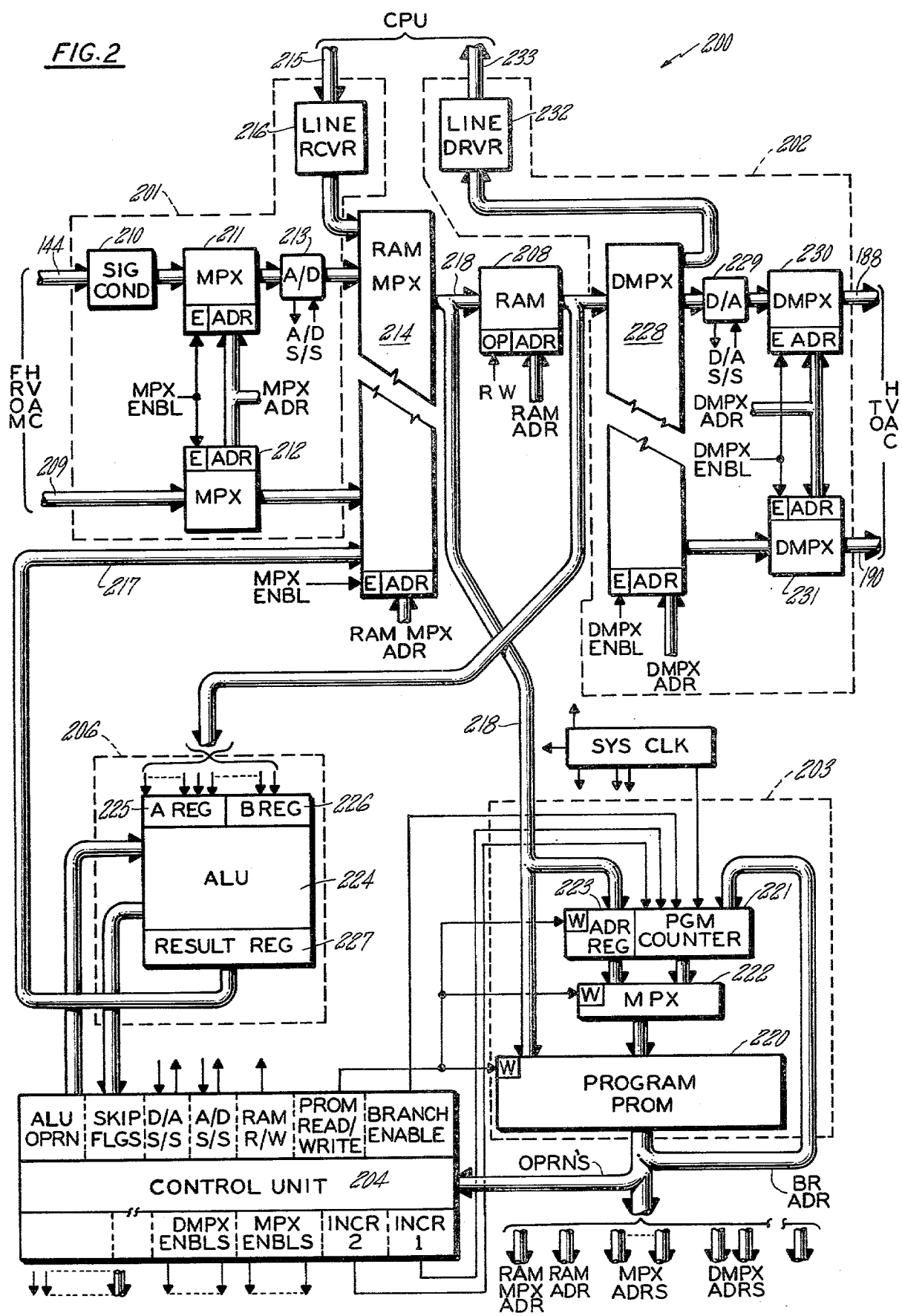
FIG. 2 is a simplified, schematic block diagram of a microprocessing system as may be used with the present invention.

Referring now to FIG. 2, an RMP 200 which may be used to implement the control system of the present invention is illustrated as having the architecture of a typical digital microprocessor system. The RMP is a combination of basic microprocessor elements including: input, output sections 201, 202 for receiving and transmitting data to the HVAC system and CPU; a main memory section 203 for providing programmed instructions for the RMP through operand address programming; a control unit 204 for providing program control over RMP operation sequencing; an arithmetic unit 206 for providing the operational add, subtract, multiply, and divide functions of the RMP; and a random access memory (RAM) 208 for providing memory storage of the interim and final result outputs from the arithmetic unit 206 and for all signal information from the input section 201, including sensed HVAC data and CPU instruction commands.

The input section 201 receives the analog sensed signals from the HVAC on the trunk line 144, in addition to any discrete signals from the HVAC, such as temperature alarm units and pneumatic line ΔP limits, on a line 209. The analog signals on the line 144 are presented through signal conditioners 210 to the input of a multiplexer (MPX) 211 and the discrete signals on lines 209 are presented to the input of an MPX 212, both MPX's being under program control from the programmable memory 203. The output of the MPX 211 is presented to an analog-to-digital (A/D) converter 213 which exchanges start/stop commands with the control unit 204. The output of the A/D 213 and MPX 212 are presented to inputs of a RAM MPX 214 which also receives CPU signal information presented from the line 215 through a line receiver 216, in addition to the output from the arithmetic unit 206 on lines 217. The MPX 214 scans each of the input lines under a RAM MPX program address from memory 203 on command of MPX strobes generated by the control unit 204, and presents the information at each input through lines 218 to the RAM 208, which stores it in a memory location defined by the RAM address programming from the main memory. In addition, the output from the MPX 214 on the lines 218 is presented to the input of the main memory 203 to provide, under command of a program subroutine, access by the CPU to the main memory 203 for reprogramming the RMP operational instructions stored in the main memory.

The main memory section 203 includes a programmable read only memory (PROM) 220 normally responsive to the output of a program counter 221 presented through an MPX 222. The PROM 220 may actually comprise a read/write memory so as to be alternatively responsive to CPU interrupt or reprogramming instructions presented on the lines 218 to another input of the PROM 220 and to an address register 223, connected through the MPX 222. The PROM 220 provides operand address programming for the RAM MPX 214, the RAM 208 address, and the program address for the multiplexers and demultiplexers (MPX, DMPX) of the input and output sections 201, 202. In addition the PROM 220 provides the operand addressing to the control unit 204 and the branch address to the program counter 221.

The arithmetic unit 206 includes an arithmetic logic unit (ALU) 224 which performs the selected mathematical function on the data presented from the RAM 208 through the operating A and B registers 225, 226. The result of the ALU operation is presented through a result register 227 to the input of the RAM MPX 214. The ALU operation (add, subtract, multiply, or divide) is selected by the control unit 204, and the RAM operand address, which controls the data presented to the ALU from the RAM, is provided from the PROM. As may be required, SKIP FLAGS are generated by the ALU and presented to the control unit to provide PROM skip instructions as may be necessary during the particular mathematical operation being performed. The result data stored in the RAM 208 is presented to the CPU and to the HVAC system (on CPU request or PROM 220 program command) through a demultiplexer (DMPX) 228 which, under program control from the PROM 220 presents the HVAC analog command signals, i.e. the input signals to the EP transducers of FIG. 1, through a digital-to-analog converter (D/A) 229 and DMPX 230 to the lines 154, 164, 166, 180, 181 and 182 within the trunk line 188 (FIG. 1), the HVAC discrete signals through a DMPX 231 to the lines 151, 168, 170, 184-186, 196, and 198 within the conduit 190 of FIG. 1, and the data output to the CPU through a line driver 232 and lines 233. Both DMPX's 230, 231 are under program control from the PROM 220 and the D/A 229 exchanges start/stop strobes with the control unit 204.

In operation, as known to those skilled in the art, the MPX 214 reads all of the input data to the RMP 200 into the RAM 208 where it is stored at address locations determined by a RAM address program from PROM 220. The PROM scans and identifies all data entries to the RAM, both sensed HVAC parameter information and inputs from the CPU, by ordering both stored data and stored control character code information from the RAM 208 into the A and B registers 225, 226 of the arithmetic unit 206. A PROM program subroutine then sequentially compares identifying characters contained within selected bytes of the information word with each of a plurality of identifying characters within the character code until the information word is identified. Depending upon the identification of the information word, the program may branch to various addresses as determined from the PROM 220 and the word may be returned to the same location in RAM or changed to a different address location. This may be accomplished through SKIP FLAGS dependent on results in the ALU 224 and presented to the control unit 204. A SKIP FLAG causes the program counter to increment two steps, such as to bypass a branch instruction; no SKIP FLAG causes an increment of one, allowing execution of the next sequential instruction (operational or branch). Use of various branch instructions enables the program to unconditionally branch to an address stored in PROM 220, to call up various subroutines as required for the program operation during normal running of the RMP.

The RMP includes a subroutine for identifying CPU program change instructions, wherein a first word from the CPU is presented through the MPX 214 into a RAM 208 memory location determined by the address program. The word is identified by the normal PROM scanning of the stored RAM data through the subroutine described hereinbefore. When identified as a CPU instruction, a PROM write strobe from the control unit 204 is presented to the address register 223 allowing entry into the register of the next word from the CPU appearing on the line 218 and containing the desired address location in PROM 220 of the new CPU instruction. A third word from the CPU, containing the instruction change information, is presented from the lines 218 to the input of the PROM 220 simultaneously with the presentation of a second PROM write strobe from the control unit 204 to the MPX 222 which allows the PROM 220 to read the address location stored in the register 223 together with the instruction word appearing at the input on the line 218. In this manner operating program instructions stored in the PROM 220 may be altered by CPU command. Similarly the values of operating constants for the inner loop control of the HVAC system, which are stored in the RAM 208, may similarly be changed on CPU instruction which orders the PROM 220 to pull out the appropriate constant stored in the RAM 208 and read in the new value of the constant from the CPU.

The RMP 200 is free running, i.e. asynchronous with the CPU, and scans the sensed analog and discrete input signals from the input section 201 at a rate typically ten times greater than that required by the CPU, i.e. typically the CPU receives data from the RMP every 10 seconds, and the RMP scans all of the data input lines and closes each of the proportional gain inner control loops every one second. The normal free running scan of the sensed parameters is interrupted for communication with the CPU, for both program change commands and commands for data read out from the RAM 208. The interrupt time represents approximately 5% of the total RMP running time. The CPU also interrupts the RMP to provide loading of CPU calculated temperature reference values into the RAM 208, to command the RMP 200 to provide comparison of the duct reference temperature with the stored sensed temperature values, and to generate the resultant error control signal to the appropriate valve or damper actuator within the HVAC system. The control procedures for the RMP 200 is stored in the PROM 220 while the RAM 208 stores both the sensed data and control character code subroutine information, in addition to providing scratch pad storage for the arithmetic unit 206. Similarly, specific data acquisition software, i.e. unique configuration tables for a specific control loop is loaded from the CPU and is stored in the RAM 208. Memory capacity for the RMP is typically 2K words of PROM and 4K words of RAM. In addition to providing the data acquisition from the HVAC system sensors and proportional inner loop control of the HVAC control devices, the RMP also provides a program shutdown routine stored in the PROM 220 for relinquishing control from the CPU to the existing HVAC site control loop. It should be understood that the RMP of FIG. 2 is illustrative of one configuration of a dedicated microprocessor system suitable for providing the data acquisition and front end processing of data for the CPU, and the specific architecture is dependent on a given particular implementation of the present invention and forms no part of this invention. Similarly, any suitable general purpose microprocessor known in the art and having the requisite characteristics, such as the industry standard model 8080A, may be used if desired with standard programming techniques.

Figure 3:
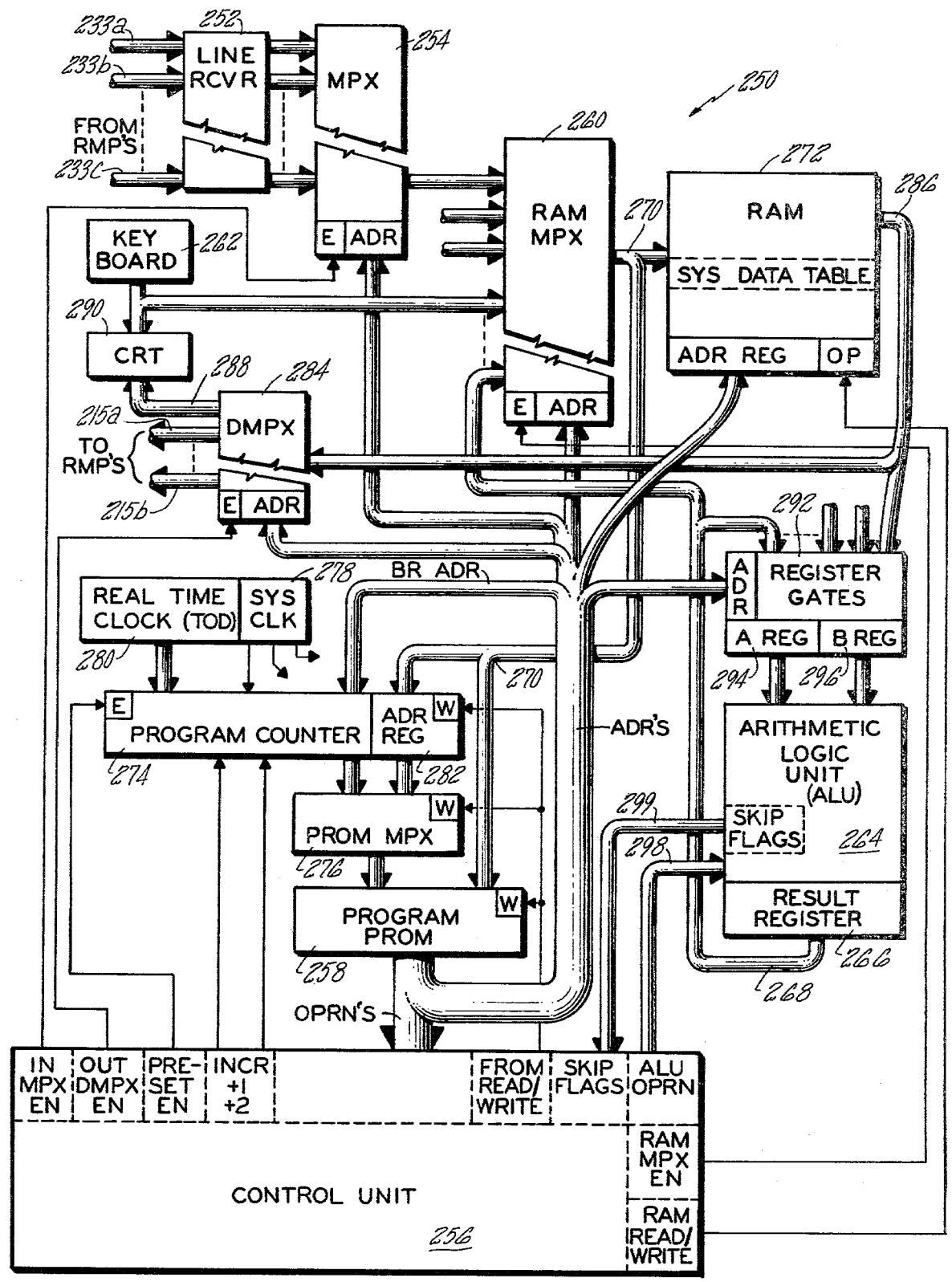
FIG. 3 is a simplified schematic block diagram of a real time digital processing system as may be used with the control system of the present invention.

Referring now to FIG. 3, a system which may incorporate the central control function of the present invention is illustrated as representing the architecture of a typical, real time data processing system 250. Input data lines 233$_a$–233$_b$ from each of a plurality of RMPs, such as the RMP 200 of FIG. 2, are presented through line receivers 252 to a corresponding one of a plurality of inputs of an MPX 254 which, when enabled by a strobe from a control unit 256, sequentially scans the input lines under address program control of a programmable read only memory (PROM) 258. Each of the input data signals are presented in turn through lines 259 to one input of a RAM MPX 260 which scans a plurality of RAM input data lines including the output of a keyboard 262 presented through lines 263, and the output of an arithmetic logic unit (ALU) 264 presented through a result register 266 and a set of lines 268. The RAM MPX 260 scans each of the input lines when enabled by a strobe from the control unit 256 under address control from the PROM 258, and presents the selected input data lines through a set of lines 270 to the input of a RAM 272 and to a write input of the PROM 258. The RAM 272 is similarly under an address program control from the PROM 258 and receives an operational code strobe (RAM READ/WRITE) from the control unit 256.

The control unit 256 responds to command inputs from the PROM 258 which in turn is under control of a program counter 274 presented through a PROM MPX 276. The program counter 274 receives the output of a system clock 278 which provides the CPU operating time base, and also the output from a real time clock 280 which provides the time of day (TOD) with a timekeeping capability ranging from seconds to years. The program counter 274 is also responsive to pre-set enable, and increment one, and increment two strobes from the control 256. The PROM MPX 276 is responsive to read/write control signals from the control unit 256 to present either the output of the program counter 274, or alternatively the output of an address register 282 to the input of the PROM 258. The address register 282 receives the output of the RAM MPX 260 on the lines 270 and is used in conjunction with a subroutine similar to that described hereinbefore with respect to the RMP 200 of FIG. 2, to provide reprogramming of the PROM 258 through keyboard 262 entry by a maintenance operator.

In addition to providing the address programming for the MPX's 254, 260 and the RAM 272, the PROM 258 also provides operational address programming for a demultiplexer (DMPX) 284 which presents the output from the RAM 272 on lines 286 to a plurality of output lines including lines 288 to a video display (CRT) 290 which provides visual display of input information presented through the keyboard 262 by the operator and output data presented to the RMP from the CPU, and lines 215$_a$–215$_b$ to the RMPs. The PROM 258 also provides the branch address to the program counter 274 and program address information to address register gates 292 which control the data flow into the A and B registers 294, 296 of the ALU 264.

The stored program within the PROM 258 is implemented through the control unit 256 which provides enabling strobes for the CPU multiplexers and demultiplexers in addition to providing operative read/write instructions to the RAM 272 and operation instructions (arithmetic, logic, compare, etc) to the arithmetic unit 264 on lines 298. The control unit 256 receives instruction inputs to alter the PROM sequence from SKIP FLAGS generated in the ALU 264 and presented on the lines 299.

The real time data processing system of FIG. 3 represents one configuration of a dedicated hardware, real time data processing apparatus which may be advantageous for use in implementing the control system of the present invention where general purpose programming is neither required nor practical in view of the control functions to be performed. It should be understood, however, that the specific architecture is dependent on the particular implementation of the present invention, and forms no part of the present invention. If it is deemed necessary, or practical, any one of a number of well known processing systems may be used as may be obvious, or readily apparent, to those skilled in the art. As is more apparent in the light of detailed operational descriptions provided hereinafter, well known processing systems such as the Digital Equipment Corporation model PDP 1135 or 1140 general purpose computers used in combination with real time operating software such as the Digital Equipment Corporation RSX-11M real time software system, employing only programs provided through programming techniques well known in the art, may be utilized in conjunction with the remote microprocessor and the HVAC sensors and interface control equipment described hereinbefore.

Referring now to FIG. 5 illustration (a), in the operation of the HVAC system control according to the present invention, a given set of sensed space temperatures ($T_{sp}{}^A$) 300–302 for the spaces 98–100 (FIG. 1) and a sensed OAT 304 are plotted against time (t). At time $t_o$ the temperatures 300–302 are approximately equal to a medium temperature of a space temperature drift band established by a space cool set point temperature reference ($T_{sp}C^R$) 306 and a space heat set point temperature reference ($T_{sp}H^R$) 308. The space cool and heat set point temperature references establish the temperature threshold limits above and below which mechanical cooling and heating will be provided (energizing the cooling coil 64 or heating coil 62 of FIG. 1) in response to a sensed space temperature outside the threshold band. For the condition wherein all of the spaced sensed temperatures are within the drift band limits neither heating nor cooling is provided, and the control system causes the HVAC system to attempt space temperature regulation at some determined temperature within the drift band limits through the use of mixed air within the chamber 28 (FIG. 1).

As described hereinbefore, the mixed air temperature is dependent on the position modulation of the OA dampers 34$_a$, 34$_b$ (FIG. 1) and the return air dampers 33 (FIG. 1), and is used to either maintain the space temperatures at a quiescent value within the temperature drift band by a mixture having a majority of RA, or to provide cooling air to the space to reduce the hottest sensed space to an adjustable mixed air space temperature reference by a mixture having a majority of OA. The present invention also provides linear positioning of the min OA dampers 34$_b$, i.e. continuous position modulation of the min dampers between full open and closed positions as a function of the desired amount of OA, the occupied or unoccupied status of the spaces, and the energized or deenergized status of the supply fan (26, FIG. 1). This differs substantially from the min damper control of prior art systems which merely discretely position the min dampers either at some open position or at full closed as a function of supply fan energizing/deenergizing, and results in more effective control of space temperatures with the mixed air, thus reducing the duty cycle for mechanical heating or cooling and reducing HVAC energy consumption.

Figure 6:
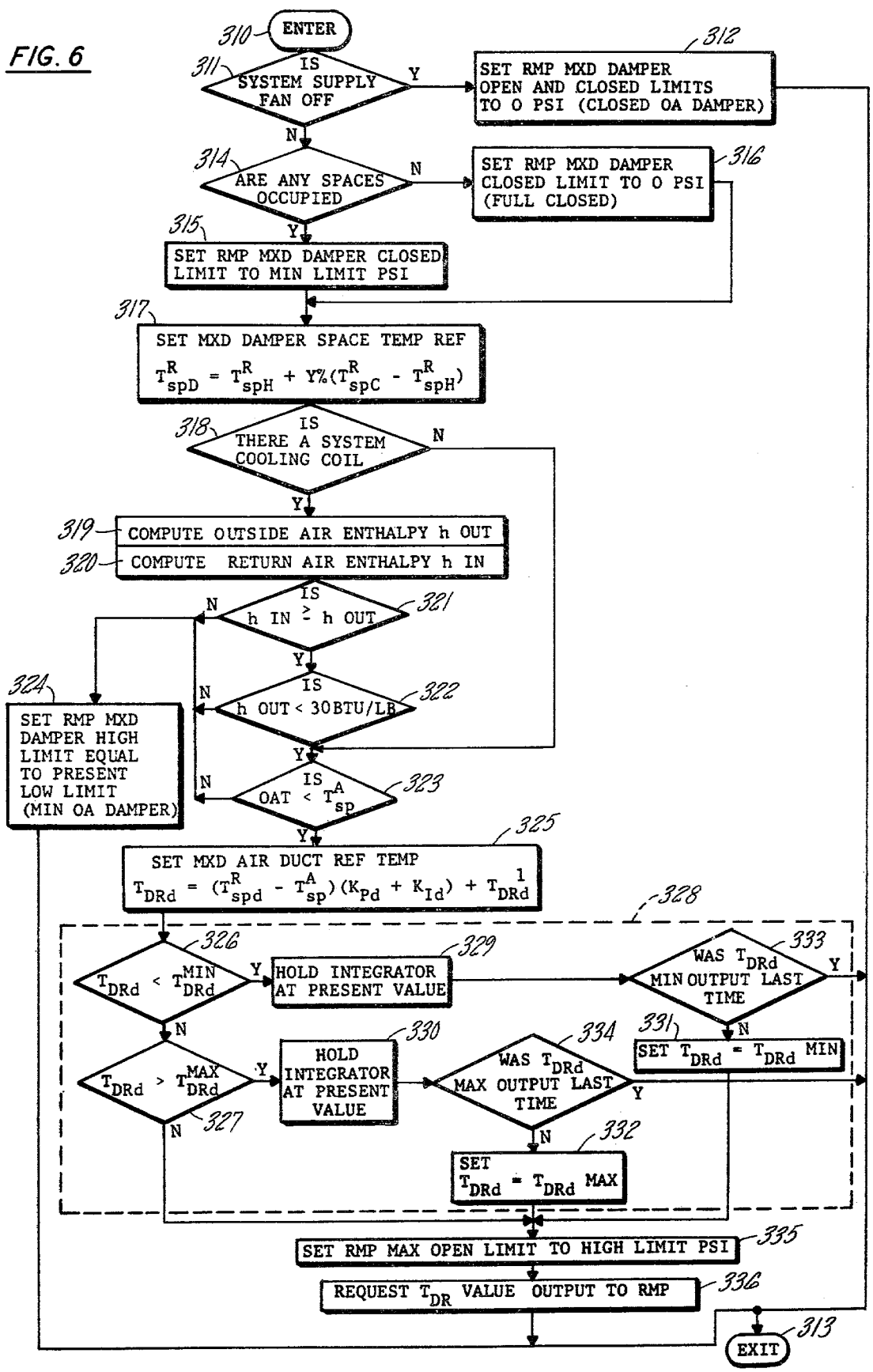
FIG. 6 is a logic flow chart diagram illustrating the processing steps incorporated in one of the control functions of the control system of the present invention.

Referring now to FIG. 6, in a flow chart illustrative of the mixed air control performed by the CPU 250 (FIG. 3) in combination with the RMP 200 (FIG. 2), the CPU enters the mixed air control program listing at 310, and CPU instructions 311 request information from the RMP regarding the energized/deenergized status of the supply fan 26 (FIG. 1) which is determined by the presence or absence of a gate signal on the line 196 to the switch 192 of FIG. 1, the status information being stored in the RMP RAM 210 (FIG. 2). When the supply fan is off CPU instructions 312 command the RMP to generate a full closed pneumatic signal (zero psi) to the mixed air actuator 38 and minimum damper actuator 54 (FIG. 1) to fully close both OA dampers 34a, 34b, after which the CPU exits the program at 313. If the supply fan is on, instructions 314 request information as to space occupancy status which is determined by the CPU from the calender day and time of day (TOD) information provided from the real time clock 280 (FIG. 3) and stored in CPU RAM 272, in combination with occupancy schedule information as a function of the date and TOD which is stored in the CPU RAM 272 and which may be modified through reprogramming by maintenance personnel via keyboard 262 (FIG. 3). If the space is occupied, instructions 315 request the RMP to set a closed limit for the min damper actuator 54 to prevent the actuator from closing the damper 34b below a minimum open position required for adequate fresh air ventilation. If the spaces are not occupied, the RMP is requested by CPU instructions 316 to set the closed limit at full closed to allow the OA actuators to drive both dampers 34a, 34b to the full closed position as may be required for temperature control. After the appropriate closed position limit is established, instructions 317 request CPU calculation of a mixed air damper space temperature reference ($T_{spd}^R$) which, as shown in the instruction block 317, is equal to the space heat set point reference ($T_{spH}^R$) plus a fractional part (Y%) of the space drift temperature band magnitude. The factor Y% is selectable by the maintenance personnel from the range 0 to 100%, the value being entered into the CPU RAM 258 through the keyboard 262 (FIG. 3). Typical Y% values range from 20% during the cooling season to 80% during the heating season with the exact value selected on the basis of the unique characteristics of a given HVAC system. The value is readily changed through reprogramming by keyboard entry. For a mean value of Y%=0.5, and cool set point and heat set point temperature references equal to 78° and 68° F. respectively, the mixed damper space temperature is equal to 73° F. CPU instructions 318 determine whether or not there is a system cooling coil. In the absence of a cooling coil, i.e. a heat only HVAC system, enthalpy considerations are not important from an energy conservative standpoint since the OA enthalpy value only determines the amount of work (energy) required to cool the OA. In the absence of a cooling function, the OA dry bulb temperature alone is more significant in determining comfort level to the occupants of the temperature controlled spaces, therefore, for a system with no cooling coil the enthalpy test is bypassed and the only limitation on the use of OA is the outside temperature with respect to the hottest space.

After establishing the value of $T_{spd}^R$ for an HVAC system with a cooling coil, the CPU computes OA enthalpy ($h_{out}$) and RA enthalpy ($h_{in}$) in instructions 319, 320 based on sensed data received from the RMP on outside and return air temperatures and relative humidity. Instructions 321 compare $h_{out}$ with $h_{in}$ and instructions 322 determine whether $h_{out}$ is less than a determined absolute value, typically 30 BTU/LB. If the OA enthalpy is less than, or equal to, the return air enthalpy in addition to having an absolute value less than 30 BTU/LB 309, then the OA enthalpy conditions are satisfactory and the CPU next determines through instructions 323 whether the OAT is less than the sensed space temperature ($T_{sp}^A$) of the hottest space (98-100 of FIG. 1). If either the OA enthalpy or OAT conditions are not satisfactory, CPU instructions 324 command the RMP to close the OA dampers (34a, 34b) to the presently established closed limit position.

If the OA enthalpy and temperature conditions are satisfied, CPU instructions 325 calculates a mixed air duct reference temperature ($T_{DRd}$) as a function of the mixed damper space reference temperature ($T_{spd}^R$) and the sensed temperature of the hottest space. As shown:

$$T_{DRd} = \Delta T(K_{Pd} + K_{Id}) + T_{DR'd},$$

where $\Delta T = (T_{spd}^R - T_{sp}^A)$ is the space temperature error, $K_{Pd}$(°F./°F.) is a proportional gain constant, and $K_{Id}$(°F./°F.-min) is an integral gain constant. The proportional and integral gain values are determined with consideration given to the gain and transient temperature characteristics of the particular HVAC system ducting and mixed air damper control loops. Typical values for the mixed air damper control loop are $K_{Pd}$=10(°F./°F.) and $K_{Id}$=0.36(°F./°F.-min). The term $T_{DR'd}$ represents either a fixed set point temperature value used on initialization, i.e. the first CPU calculation of $T_{DRd}$ in a given control time period, or the summation of the fixed set point temperature value used at initialization and the integral of the space temperature deviation from the mixed damper space and the gain constant $K_{Id}$ over the time period between initialization and the present calculation. A typical initialization set point value for $T_{DR'd}$ is 65° F. which may be changed by keyboard entry. The calculated value of $T_{DRd}$ is a function of the proportional gain term and the integral gain function based on the cycle iteration time of the flow chart. The CPU executes the flow chart at fixed interval time periods, typically five minutes, and the CPU integrates the product of the space temperature error and the integral gain constant over the fixed interval time period to provide a discrete integration value which is summed with the proportional error value and $T_{DR'd}$.

The discrete value of $T_{DRd}$ calculated by the CPU is next compared, in instructions 326, 327 of a subroutine 328, with stored min/max values of mixed air duct reference temperature stored in the CPU RAM 258 (FIG. 3). The min/max values are determined as a function of the characteristics of a given HVAC installation, or on the temperature conditions on a given day, and may be readily changed by the maintenance operator at the central CPU through entry by the keyboard 262. If the calculated value of mixed air duct reference exceeds the min/max limits, instructions 329, 330 require the integrator function to maintain the present value of mixed air duct reference stored in the integrator, and instructions 331, 332 request the CPU to set the presently calculated value of $T_{DRd}$ to the corresponding minimum or maximum value. If the limits were exceeded on two consecutive runs of the mixed damper flow chart, instructions 333, 334 require the CPU to exit the program to save time. After establishing the value of $T_{DRd}$, instructions 335 command the RMP to set the open position limit for the OA damper actuators (38, 54 of FIG. 1) to a maximum value, i.e. 100% OA to allow full open positioning of the dampers 34a, 34b if required, and instructions 336 request the CPU to read out the established value of $T_{DRd}$ to the RMP.

Figure 10:
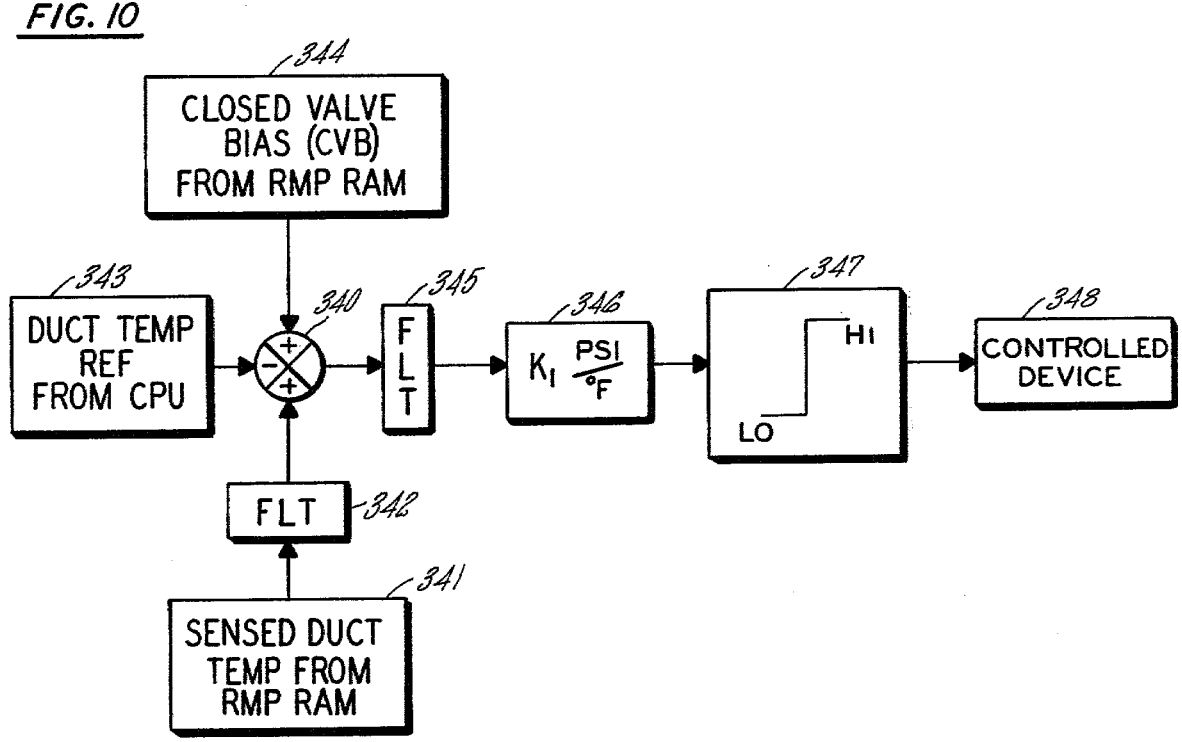
FIG. 10 is a simplified block diagram of a proportional gain control loop used in the control system of the present invention.

The RMP compares the reference temperature $T_{DRd}$ from the CPU to an actual sensed duct temperature value of mixed air to provide a simple proportional loop control over the corresponding control device, i.e. steam or chill water valve position, or damper actuator input. Referring to FIG. 10, in a simplified block diagram illustration of the proportional control loop provided by the RMP includes a summing junction 340 for providing a summation of the difference temperature between the signal output of the sensed mixed air duct temperature sensor 341 presented through a digital low pass filter 342 of a type known in the art for eliminating high frequency noise pickup, the duct temperature reference value ($T_{DRd}$) 343 from the CPU, and a closed valve bias (CVB) 344 stored in the RMP RAM 208 (FIG. 2). The value of the mixed air temperature is sensed at the cold deck discharge with the sensor 121 of FIG. 1. In the absence of mechanical cooling actuation, the cold deck discharge temperature provides a more accurate measurement of the mixed air than that obtained through measurement within the chamber 28 (FIG. 1) where stratification of the air results in large temperature gradients, and sensed temperature errors. The output from the summing junction is presented through a second low pass digital filter 345 to the input of a proportional gain circuit 346 which provides a proportional gain and scale factor conversion from temperature degrees to psi. The output signal from the circuit 346 is presented to a threshold limit circuit 347 which provides the open and closed damper position limits prescribed for the corresponding control device and subject to change in CPU instructions 312, 315, 316, 324 and 335 of the mixed air temperature control flow chart of FIG. 6. The output signal from the limit circuit 347 is presented to the input of the respective control device 348 which responds with a change of position. The CVB is a constant bias which may provide an operating reference point for the range of operation of the control device, i.e. the CVB in the control loop for the mixed air actuator 38 and minimum actuator 54 may be established at some mean value of the actuator range of travel to allow modulation of the associated dampers around a mean position towards open or closed positions in response to the magnitude and polarity of the corresponding temperature error. For the control loop of the steam or chill water valves of the heating and cooling coils which are activated only below or above the set point temperatures, i.e. a unidirectional temperature error, the CVB may be provided to insure a fully closed valve position for a temperature error at or below the corresponding activating threshold value.

The flow chart of FIG. 6 is periodically executed at a determined interval time period, and the CPU calculates the mixed air duct reference temperature each time using the latest sensed data requested from the RMP. The CPU commands damper position limit value changes for the OA dampers to the RMP as required by status condition changes, and reads out the new reference value of $T_{DRd}$ to the RMP which provides the requisite error signal to the control device, i.e. the EP transducer 152 (FIG. 1) which controls the magnitude of the pneumatic signal to the mixed air damper actuators 38, 54. While the central control provides mixed air modulation of the temperature within the decks, it simultaneously provides position control over the damper sets 106-108 of the spaces 98-100 (FIG. 1) through execution of a separate program control as illustrated by the flow chart of FIG. 7.

Figure 7:
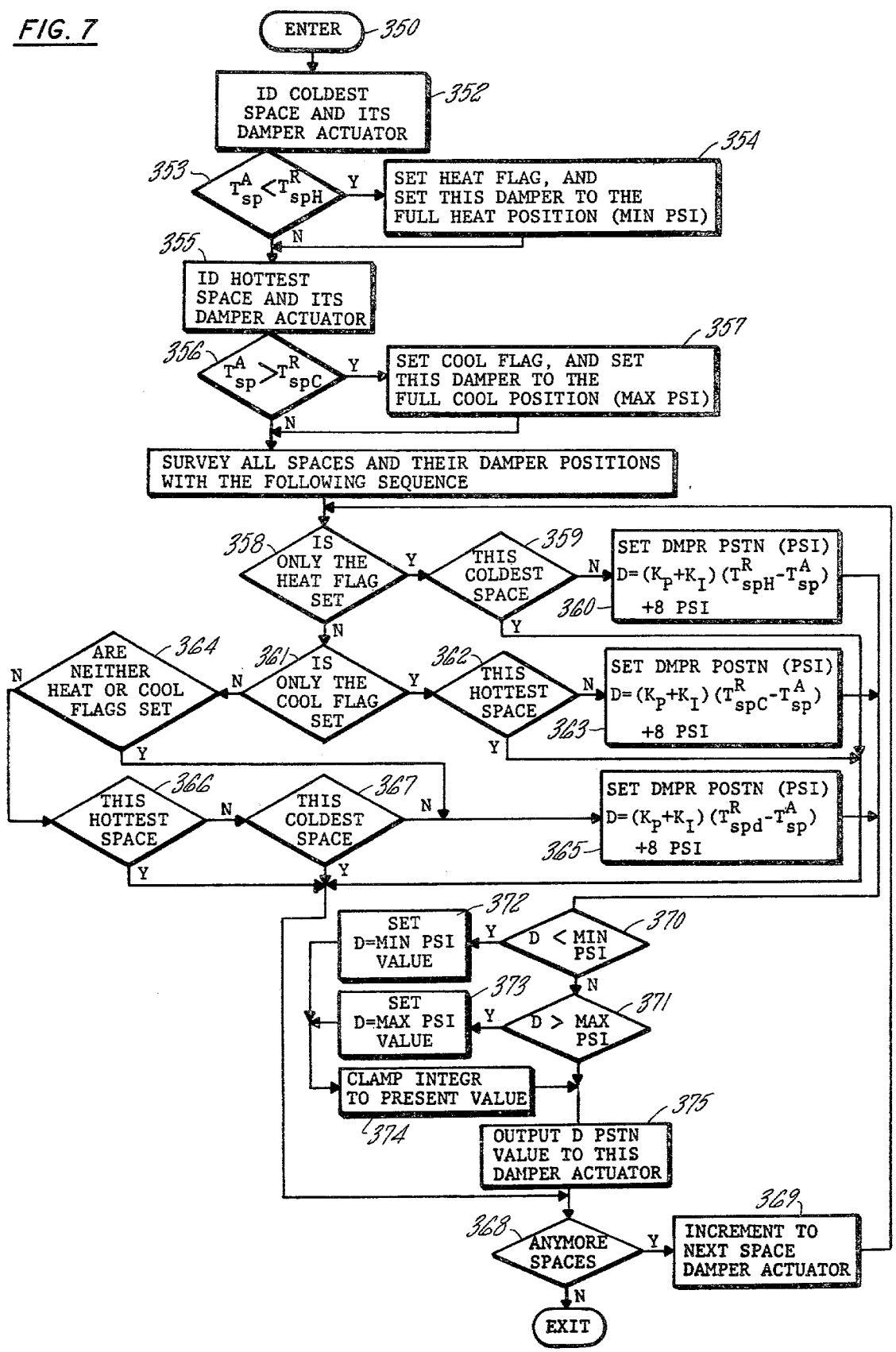
FIG. 7 is a logic flow chart diagram illustrating the processing steps incorporated in another control function of the control system of the present invention.

Referring now to FIG. 7, in a flow chart illustrative of the central control of the CPU over the position of the damper sets 106-108, the CPU enters the flow chart at 350, and the first set of instructions 352 identifies the coldest of the spaces 98-100 (FIG. 1) and its associated damper by comparison of the sensed space temperature values provided by sensors 124-126 and stored in the RAM 208 of the RMP. After identification, CPU instructions 353 determine whether the actual space temperature $T_{sp}^A$ is less than the heat set point temperature ($T_{spH}^R$). If less, instructions 354 set a HEAT FLAG to identify the corresponding damper set and generates an output signal to the corresponding EP transducers (176-178 of FIG. 1) to position the damper to the full heat position (min psi). If the actual space temperature is not less than the heating set point reference, and if necessary setting the HEAT FLAG, the next CPU instruction group 355 identifies the hottest space and its associated dampers. The sensed temperature of the hottest space is compared with the cool set point reference in instructions 356, and if greater than the cool set point, CPU instructions 357 set a COOL FLAG to identify the damper and generates a command to the associated EP transducer to position the damper to the full cool position (max psi). After identifying the coldest and hottest spaces in the HVAC system and, if necessary, setting the corresponding HEAT or COOL FLAGS, the CPU executes a subroutine which surveys each space sensed temperature and associated damper set to determine whether damper position will be controlled to the heat set point ($T_{spH}^R$), the cool set point ($T_{spC}^R$), or the mixed air space set point ($T_{spd}^R$).

Each space and damper set is interrogated beginning with instructions 358 which determine if only the HEAT FLAG is set. If the answer is yes, i.e. no COOL FLAG is set in the system, then all of the space dampers will be controlled to the heat set point reference. Instructions 359 determine if the instantaneous space being examined is the coldest space and if so command the CPU to bypass the remaining portion of the subroutine and increment to the next space through instructions 368, 369 since the coldest space damper has already been set to full heat position (instructions 353, 354). If not the coldest space, instructions 360 calculate the damper position (D) as a function of the space temperature error between the heat set point reference and the actual sensed temperature, as shown by the equation in instruction block 360, where ($T_{spH} - T_{sp}^A$) is the space temperature error which is multiplied by a proportional gain term ($K_P$) and an integral gain ($K_I$). As descibed hereinbefore with respect to FIG. 6, the product of space temperature error and integral gain constant is integrated over a fixed time period equal to the time interval period governing execution of this flow chart, and the resultant discrete integral value is summed with the proportional gain product and damper actuator bias signal. If the HEAT FLAG is not set, instructions 361 determines whether only the COOL FLAG is set. If only the COOL FLAG is set and instructions 362 determine that the space is the hottest one, the CPU is again commanded to bypass the remaining portion of the subroutine and increments to the next space in instructions 368, 369. If the space is not the hottest, then instructions 363 calculate the corresponding damper position (D) as a function of the sensed space temperature deviation from the cool set point reference ($T_{spC}^R$) through the equation: $D = (K_P + K_I)(T_{spC}^R - T_{sp}^A) + 8$ psi, where the proportional and integral gain terms are identical to the gains of instructions 360.

If neither the HEAT FLAG, or COOL FLAG alone are set, instructions 364 determine if neither FLAG is set. If neither is set then the temperature in all of the spaces 98–100 are within the temperature drift band and CPU instructions 365 control the damper position of each space to the mixed air space temperature reference ($T_{spd}^R$), setting the damper position of each space in dependence on the product of the corresponding space temperature error and the proportional and integral gain constants. If both HEAT and COOL FLAGS are set, but the space being examined is neither the hottest space, instructions 366, nor the coldest space, instructions 367, then the damper position is again set through instructions 365 as a function of the mixed air space temperature reference. If the space is the hottest or coldest then the routine is ended and the CPU increments to the next space through instructions 368, 369.

After setting the instantaneous damper position value in the proper one of the sets of instructions 360, 363, or 365, the computed value of damper position is compared with stored minimum position limits (min psi in a pneumatic system) in instructions 370, and maximum position limits in instructions 371. If the value exceeds either limit, it is set to the corresponding minimum or maximum value limit in instructions 372, 373, and CPU instruction 374 clamps the integral gain function to the present value. The damper position value is output to the RMP through instructions 375, and the routine is repeated for the next space damper.

As illustrated by the flow chart of FIG. 7, in the multi-zone type of HVAC system of FIG. 1 wherein the damper sets 106–108 are readily accessible, i.e. in close proximity to a central equipment room such that the actuators 110–112 may be interfaced with the central control of the present invention, significant energy conservation in control of the space temperatures is achieved. This results from the control of the respective space damper positions by the CPU to a space set point temperature reference which will minimize total energy consumption. For the situation wherein only a HEAT FLAG is set as a result of one of the spaces falling below the heating set point reference, mechanical heating must be provided to raise the temperature of that space above the set point limit. The amount of increase in hot deck discharge temperature ($T_{DH}^A$), and consequently the amount of energy consumed, is determined by the amount of heat required to be supplied to that space to raise its temperature above the set point limit. To minimize the amount of heat loss in the hot deck 23 (FIG. 1) to the remaining spaces (all of which are above the heat set point) the CPU calculates the damper position of each of the other spaces in dependence on the space temperature error between the actual sensed temperature of the space and the space heat set point reference. Since all of the other spaces are above the set point reference, the space temperature error $\Delta T_S = T_{spH}^R - T_{sp}^A$ results in a negative quantity which drives the damper position toward the max cooling position, closing off access to the hot deck 23 and minimizing the bleed off of hot air from the deck. This in turn maximizes the hot airflow into the coldest space which in turn minimizes the increase in hot deck discharge temperature and required energy consumption. When compared with prior art systems wherein each space is allowed to command its own space temperature reference requiring a much higher hot airflow to satisfy both the coldest space and the demand of the other spaces, the space damper position control illustrated in FIG. 7 provides a significant energy savings. The identical result is achieved for the situation wherein only a COOL FLAG is set, i.e. controlling the remaining space dampers to the cool set point reference when each is below the reference value forces these dampers towards the full heat position thereby minimizing the amount of cool airflow required to cool off the hottest space. Since no heat is provided for only a COOL FLAG set, positioning the space dampers toward the full heat position does not result in energy loss. For the situation wherein both HEAT and COOL FLAGS are set, but the instantaneous space being examined is neither the hottest or coldest, then the damper position is controlled to the mixed air space temperature reference determined by the Y% factor since this is the optimum control point to minimize unnecessary airflow in either of the two decks.

As described hereinbefore with respect to FIG. 6, the use of outside air in providing temperature regulation of the spaces within the temperature drift band is dependent on both proper outside enthalpy conditions and outside air temperature being less than the sensed temperature of the hottest space, i.e. if the $OAT > T_{sp}^A$ then the CPU commands the RMP to close the OA dampers to the presently prescribed minimum position preventing modulation of the dampers, and fixing the intake of OA to some minimum value required for ventilation. Referring again to FIG. 5, where it is assumed that at time $t_1$ the OAT 304 exceeds the temperature of the hottest space 300, such that the OA dampers are closed to min position. Since the temperatures 300–302 are within the drift band established by the set points 306, 308, the CPU provides neither mixed air temperature control, nor mechanical heating or cooling, but solely positions the space damper sets to respective damper positions based on the mixed air space temperature reference ($T_{spd}^R$) in accordance with the flow chart of FIG. 7. FIG. 5 illustration (b) demonstrates qualitatively the position change of the OA dampers (34a, 34b) in the curve 376, and illustrates the change in position of the OA dampers towards the one hundred percent OA position 377 as the OAT increases. Similarly, illustration (b) demonstrates the RA damper position 378 as being inversely positioned to that of the OA dampers. At time $t_1$, the OA damper is closed to a minimum value (M%) and the RA dampers are opened to some maximum value.

Figure 8:
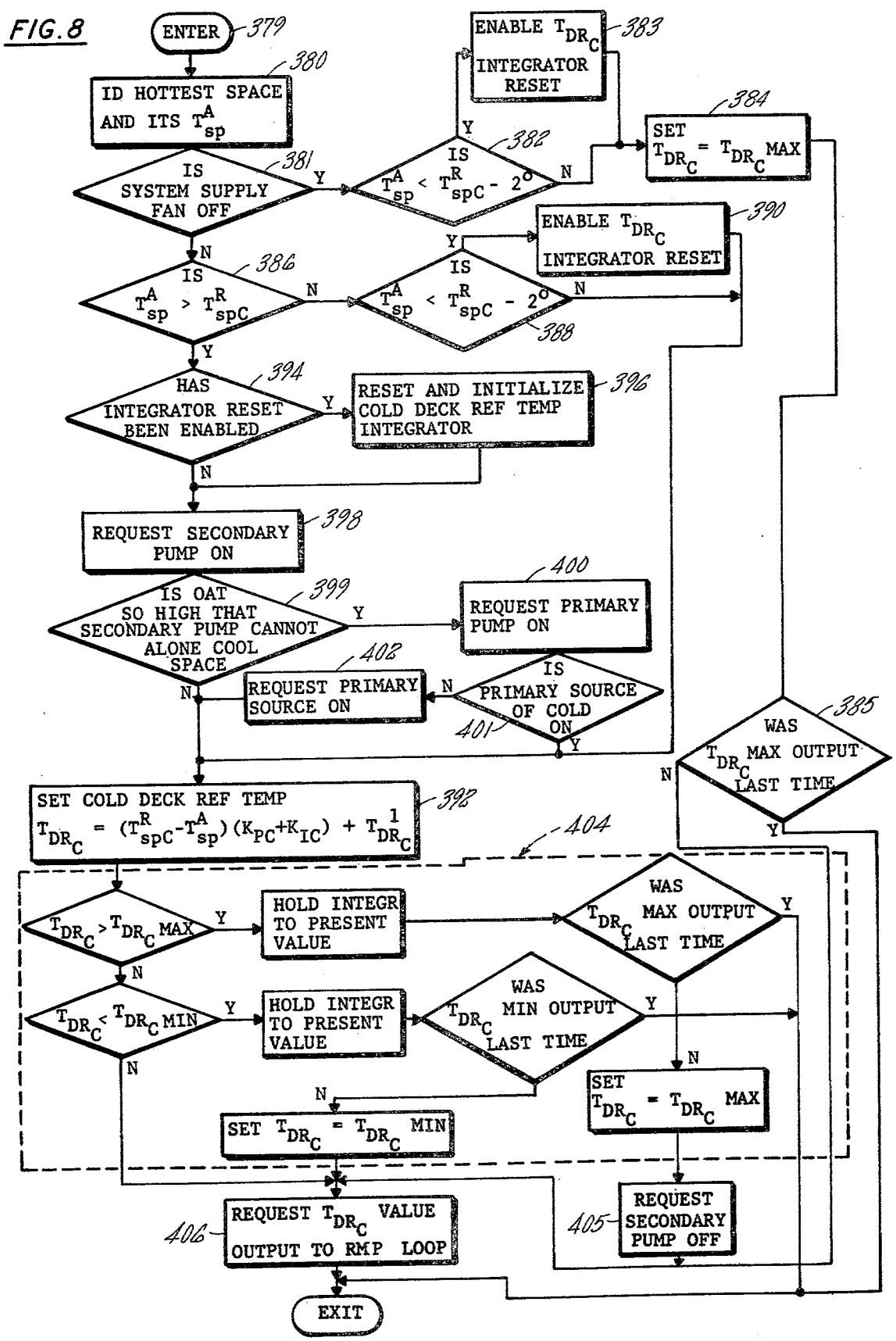
FIG. 8 is a logic flow chart diagram illustrating the processing steps incorporated in still a further control function of the control system of the present invention.

In the absence of mechanical heating or cooling, and with the continued increase in OAT 304 it is assumed that the sensed temperature 300 is increasing, but at time $t_2$ is equal to a value less than $T_{spC}^R - 2°$. Referring now to FIG. 8, in a flow chart illustrative of the CPU control over mechanical cooling of the HVAC system, the CPU enters the flow chart at 379, and the first set of instructions 380 requests the CPU to identify the hottest space and its sensed temperature value. After identification, instructions 381 determine whether or not the system supply fan (26, FIG. 1) is off, i.e. fan failure, or shutdown resulting from maintenance or power conservation, since if the fan is off the cold deck discharge air cannot be forced into the spaces and it is impractical to provide mechanical cooling. If the fan is off, instructions 382 determine whether the actual sensed temperature ($T_{sp}{}^A$) is more than two degrees below the cool set point reference ($T_{sp}{}^A < T_{spC}{}^R - 2°$). The quantity $T_{spC}{}^R - 2°$ represents the lower threshold limit of a control deadband. When the sensed temperature value of the hottest space is more than 2° below the cool set point reference, the CPU knows that the HVAC system is not supplying mechanical cooling to the spaces. Since, as described hereinafter, the flow chart of FIG. 8 calculates a cold deck discharge reference temperature using both proportional and integral gain constants similar to the mixed air reference calculation of FIG. 6, it is desirable, if the system is not on mechanical cooling control, to allow a resetting of the CPU integral gain function to eliminate any time delay resulting from the integration time constant. At time $t_2$, instructions 382 determine that the actual sensed temperature is less than 2° from the cool set point reference, and CPU instructions 383 then enable the $T_{DRC}$ integrator reset function, but do not actually reset the integrator at this time. As described hereinafter, resetting of the integrator occurs only after the sensed temperature exceeds the cool set point reference and mechanical cooling is initiated. Following instructions 382, and 383 if necessary, the CPU instructions 384 set the cold deck discharge reference to a maximum value, i.e. the hottest temperature allowed for the deck discharge temperature, so that the RMP will not activate the cooling source. Instructions 385 determine whether or not the maximum value of cold deck reference was output at the last running of the flow chart, and if it has then the CPU exits the flow chart, if not then the maximum value of the deck discharge reference is output to the RMP.

If instructions 381 determine that the supply fan is on, CPU instructions 386 next compare the actual sensed temperature of the hottest space with the cool set point reference to determine whether the sensed temperature is greater than the cool set point. At time $t_2$ the sensed temperature is not greater, and instructions 388, 390, which are identical to instructions 382, 383 described hereinbefore, determine whether the actual sensed temperature is more than two degrees below the cold set point reference and, if so, enable the reset function of the cold duct reference ($T_{DRC}$) integrator. Following instructions 388, and if necessary 390, the CPU branches to instructions 392 to calculate the value of the cold deck discharge temperature reference ($T_{DRC}$) as described in detail hereinafter. For now, it should be noted that at time $t_2$ the flow chart of FIG. 8 does not initiate mechanical cooling, i.e. turning on the cold source.

Referring again to FIG. 5, illustration (a) it is assumed that the sensed temperature 300 continues to increase until at time $t_3$ it is greater than the reference 306, such that the comparison of the sensed temperature with the cool set point in instructions 386 of FIG. 8 results in a YES condition, causing the CPU to execute instructions 394 to determine whether the reset has been enabled for the cold duct reference integrator. Since the reset was enabled at time $t_2$, instructions 396 reset the integrator to an initial condition, i.e. initiallizing the integrator by setting the output of the integrator to a predetermined cold duct reference temperature value. The significance of the reset enable function of instructions 388, 390 and the resetting of the integrator in instructions 394, 396 is to ensure that the integrator will be reset only for a sensed temperature which has increased above the cool set point reference from a prior temperature value more than two degrees below the set point, rather than a sensed temperature which exceeds the set point reference as a result of the dithering of the controlled space temperature around the cool set point value during mechanical cooling. Conversely, resetting of the integrator is allowed for sensed space temperatures more than two degrees below the cool set point so that the integral time constant will not unduly delay the control of the space to the reference set point, i.e. minimize the integrator windup time.

After resetting and initiallizing the integrator, the CPU then requests the turn on of the secondary pump for the cold source (chill water source 70 of FIG. 1) in instructions 398. This is necessary in a multiple HVAC system where a plurality of cold sources each having its own pump to maintain a determined flow through the respective cooling coil, are supplied with chill water from a common chiller. Since the primary pumps are typically high horsepower devices, it is desirable to limit the energizing of the pumps to conserve energy, so that after turn on of the secondary pump, the CPU instructions 399 determine if the OAT is above some predetermined value at which the secondary pump alone cannot provide sufficient cooling. This is to distinguish an increase in space temperature resulting from a transient temperature condition within the space from an increase due to outside ambient condition, and prevents unnecessary turn on of the primary cooling pumps, such as a turn on of the primary pumps in response to a transient high temperature in the cold deck during the winter season. If so, CPU instructions 400–402 request a turn on of the primary pump and primary cold source. As may be obvious, in a single HVAC system, instructions 398 would request the single cold source pump on and instructions 399–402 would be eliminated.

Although not shown in FIG. 8, for an HVAC system in which the heating and cooling sources are controlled with a common electropneumatic (EP) transducer, the CPU, following instructions 399–402, determines if the RMP has set the cooling mode limits for the transducer rather than the heating limits. The CPU determines whether the heating or cooling mode is set by comparing either the OAT or the appropriate sensed space temperature with a corresponding fixed reference set temperature, i.e. by comparing OAT with a set point of 65° F. such that the CPU determines that the heat limits are set when the OAT<65° F. and the cool limits are set when the OAT>65° F., or alternatively by comparing the sensed space temperature to a set point of 75° F. such that the CPU assumes that the heat limits are set when the space temperature is less than 75° and the cool limits are set when the space temperature is greater than 75° F. In this manner, the CPU prevents an HVAC system using a shared transducer from turning on and modulating the cold source valve in response to a transient high temperature in the cold deck unless the OAT, or sensed space temperature are above the corresponding set point values. This eliminates the undesirable, and unnecessary turning on of either the heat or cool sources in response to transients, or even in response to a tolerance drift in the shared transducer.

The CPU instructions 392 calculates the cold deck reference temperature in accordance with the equation:

$$T_{DRC} = \Delta T_s(K_{PC} + K_{IC}) + T_{DR'C},$$

where $\Delta T_s = (T_{spC}{}^R - T_{sp}{}^A)$ is the space temperature error. The cold duct reference is a function of the space temperature error between the actual sensed temperature of the hottest space and the cool set point, and as with the mixed air duct reference temperature ($T_{DRd}$), the space temperature error is multiplied by a proportional gain constant ($K_{PC}$) and an integral gain constant ($K_{IC}$), the values of each being determined in dependence on the transient temperature characteristics of the cold duct (24, FIG. 1) and the general HVAC system response. As with the mixed air duct reference temperature the values of the proportional and integral gain constant may be readily reprogrammed through keyboard entry (262 of FIG. 3) to the CPU by the maintenance personnel. Typical gain values for the cold deck control loop are $K_{PC} = 10(°F./°F.)$ and $K_{IC} = 0.3(°F./°F.\text{-min})$. The term $T_{DR'C}$ represents either a constant cold deck temperature set point value used for initialization, i.e. the first CPU calculation of $T_{DRC}$ in a given control time period, or the summation of the fixed set point initialization temperature and the integral of the space temperature error over the time period between initialization and the present calculation. A typical value of $T_{DR'C}$ may be 60° F., and as with the proportional and integral gain constants the value may be reprogrammed through keyboard entry depending upon seasonal or even daily outside ambient conditions. As with the mixed air duct reference temperature, the CPU provides a discrete integral term, i.e. the product of the integral gain times the space temperature error over the fixed time interval between successive running of the cooling flow chart of FIG. 8, which may again be typically five minutes. The CPU integrates the product of the space temperature error and the integral gain over the five minute interval to provide a discrete integration value which is summed with the proportional error value and $T_{DR'C}$.

The calculated value of $T_{DRC}$ is next compared with stored min/max reference values of the cold deck reference discharge temperature stored in the CPU RAM 258 (FIG. 3) in a subroutine 404 identical to the subroutine 328 of FIG. 6, described in detail hereinbefore. The min/max values may similarly be changed by reprogramming in dependence on the temperature conditions of a given day or changes in HVAC characteristics. If in executing the subroutine 404 the CPU sets the cold deck reference to a maximum value, instructions 405 request the RMP to turn of the secondary pumps, thereby shutting down the HVAC mechanical cooling, since by achieving the maximum value it is obvious from the $T_{DRC}$ equation of instructions 392 that the space sensed temperature is well below the space cool set point. The calculated cold deck reference value is then output to the RMP in instruction 406 where it is compared with a sensed cold duct temperature in a proportional gain control loop identical to that described hereinbefore with respect to FIG. 10, to control the valve position 72 (FIG. 1) of the chill water source 70 through the interface EP transducer 162.

The cooling flow chart of FIG. 8 is executed at periodic intervals which are interposed with the running of the flow charts for mixed air control (FIG. 6) and space damper position (FIG. 7). The cooling flow chart of FIG. 8 initializes mechanical cooling only when the comparison of sensed temperature with cool set point reference in instructions 386 indicates that the sensed temperature is greater than the cooling reference. At that time the cooling source pumps are turned on. At all other times the CPU provides an updated cold deck reference temperature based upon the most recent sensed value of the hottest space temperature. The use of integral gain ($K_{IC}$) in addition to the proportional gain control eliminates the "droop error" by allowing a steady state zero set point error. By eliminating the "droop error" and the resultant "throttling range" characteristic of a straight proportional gain control loop, the central control eliminates the limit cycling of the prior art systems and provides a more energy efficient use of the cold source. As may be known, the cost in cooling input air to a desired cool temperature is the single highest conditioning cost in a given HVAC system, such that eliminating the unnecessary turn on of the cold source due to limit cycling provides a significant cost reduction for both energy and equipment replacement, since wear of the actuators and valve stems is similarly reduced.

Referring again to FIG. 5, the cooling flow chart of FIG. 8 sets the cold deck reference temperature in dependence on the sensed temperature 300, which represents the hottest space at time $t_3$. The flow chart of FIG. 7 sets the space damper 106 of the space 98 having the sensed temperature 300 to the full cool position (instructions 355-357 of FIG. 7) while the remaining damper sets 107, 108 are controlled through instruction sets 361-363 to the cool set point reference. At time $t_4$ the sensed temperature 300 levels off and is exceeded by the sensed temperature 301, and the mixed air flow chart of FIG. 7 sets the damper set 107 to the full cool position, and the cooling flow chart of FIG. 8 identifies the space 99 as being the hottest. The calculation of the cold deck reference is dependent on the magnitude of the space temperature error, such that the increased error provided by the sensed temperature 301 results in a lower cold deck discharge temperature and a corresponding increase in cold source output to the cooling coil (64, FIG. 1) until such time as the sensed temperature 301 is turned around and decreases at time $t_5$ to a value less than the cool set point reference, but within the two degree deadband. The flow chart of FIG. 8 causes the CPU to control the hottest space temperature around the cool set point reference, and to provide an update calculation of the cold deck discharge temperature reference on each successive run of the flow chart. The cool deck discharge temperature is therefore modulated accordingly to control the space temperature which dithers around the cool set point reference until at time $t_6$ the cooling load diminishes and the temperature of the spaces drop below the cool set point value and the two degree deadband. If during the drop in sensed space temperature, the OAT 304 also drops below the hottest sensed temperature then the mixed air temperature control of the flow chart of FIG. 6 allows position modulation of the OA dampers (34a, 34b of FIG. 1) to control the space temperatures to a reference provided in dependence on the Y% factor (assuming the OA enthalpy conditions are satisfied). As shown in FIG. 5, illustration (d) at time $t_7$ the position of the OA dampers 378 transitions from a minimum (M%) value to a substantially 100% outside air position since the OAT, although less than the hottest sensed temperature, is still nearly equal to the sensed temperature. As the sensed space temperatures continue to drop, the flow chart of FIG. 8 provides successive update calculations of the cold deck discharge temperature reference, allowing the cold deck reference temperature value to continually increase until it equals the max value and instructions 405 request that the secondary pump be turned off, thereby shutting down all mechanical cooling.

Mechanical heating is initiated and controlled through CPU programming which is substantially identical to that used in the cooling control. As illustrated in the heating flow chart of FIG. 9, CPU enters at 410 and instructions 411 identify the coldest space and its sensed temperature. As in instructions 381 of FIG. 6 instructions 412 determine whether the system supply fan is off and, if it is off, instructions 413–416 provide the same function performed through instructions 382–385 of the cooling flow chart of FIG. 6, i.e. provide an enabling of the hot deck discharge reference integrator for a sensed space temperature greater than two degrees above the heat set point reference, set the hot deck discharge reference to the minimum value, and read out the min value setting to the RMP. Instructions 417 compare the sensed temperature with the heating set point reference at instruction 408, and if the sensed temperature is not less than the set point reference, instructions 418 determines whether the sensed temperature is greater than two degrees above the heating set point, i.e. above a two degree deadband. As with the cooling flow chart of FIG. 8, a sensed temperature greater than two degrees above the heating set point causes instructions 418, 419 to enable the reset function of the hot deck temperature reference ($T_{DRH}$) integrator. If the sensed temperature is within the two degree deadband, the integrator reset is not enabled and the CPU branches to instruction block 420 to calculate a latest value of hot deck discharge temperature reference in accordance with the equation:

$$T_{DRH} = \Delta T_S (K_{PH} + K_{IH}) + T_{DRH}'$$

where $\Delta T_S = (T_{spH}^R - T_{sp}^A)$ is the space temperature error, $K_{PH}$ is the proportional gain in °F./°F., and $K_{IH}$ is the integral gain in °F./°F.-min. This expression is identical to that for the cold deck and mixes air reference values, and the quantity $T_{DRH}'$ again represents either a constant hot deck temperature set point value which is used on initialization, i.e. the first CPU calculation of $T_{DRH}$ in a given control time period, or the summation of the fixed set point intialization temperature and the integral of the space error over the total time period between intialization and the present calculation. Typical values of proportional and integral gain are essentially equal to those used in the control of the cold deck, i.e. $K_{PH} = 10°$ F./°F. and $K_{IH} = 0.3°$ F./°F.-min, and a typical intialization value for $T_{DRH}'$ is 80° F.

Referring again to FIG. 5, illustration (a) at time $t_8$ all of the sensed temperatures 300–302 are greater than two degrees above the heating set point 308, such that instructions 417–419 cause an enabling of the $T_{DRH}$ integrator reset function. At time $t_9$ the sensed temperature 302 is within the deadband value of the heat set point, however, no mechanical heating is applied since instructions 417 determine that the sensed temperature is still greater than the heat set point. The flow chart of FIG. 9, however, continues to provide an update calculation on the value of the hot deck discharge temperature on each successive execution of the flow chart.

At time $t_{10}$ the sensed temperature 302 falls below the heat set point 308 such that the answer to instructions 417 is YES, and instructions 421 next determine if the $T_{DRH}$ integrator reset has been enabled. If the reset has been enabled, CPU instructions 422 resets the integrator, after which the secondary pumps for the heat source are turned on in instructions 423. Instructions 424 next check the primary heat source to see if it is on, and if not it is turned on together with its primary pump in instructions 425–426. Although not shown in FIG. 9, for an HVAC system wherein the pneumatic control over the individual valves in the heating and cooling sources is provided through a common electropneumatic (EP) transducer instead of the individual transducers 160, 162 (FIG. 1), the CPU determines if the RMP has set the shared EP transducer to the heating limits as opposed to the cooling limits following instructions 424–426. If not, then the RMP is requested to set the proper heating limits.

The calculated value of the hot deck discharge reference temperature provided in instruction 420 is next compared to minimum and maximum values of hot deck discharge temperature in a subroutine 428 which is identical to the subroutines 328 and 404 of FIGS. 6, 8. If it is necessary to set the value of $T_{DRH}$ equal to a minimum value in the subroutine 428, then instructions 430 request a turn off of the secondary pump, thereby shutting down the mechanical heating in the HVAC system. The setting of the hot deck discharge temperature to the minimum value is analogous to the setting of the cold deck discharge temperature to a maximum value in FIG. 6 in that a minimum value resulting from the calculation of $T_{DRH}$ in instructions 420 indicates that the sensed space temperature is far above the space heat set point reference (a negative space temperature error) such that the value of $T_{DRH}$ decreases. Following the execution of the subroutine 428, and if necessary the shut off of the secondary pumps in instructions 430, instructions 432 request a read out of the determined hot deck reference discharge temperature to the RMP and the CPU exits the flow chart.

Figure 9:
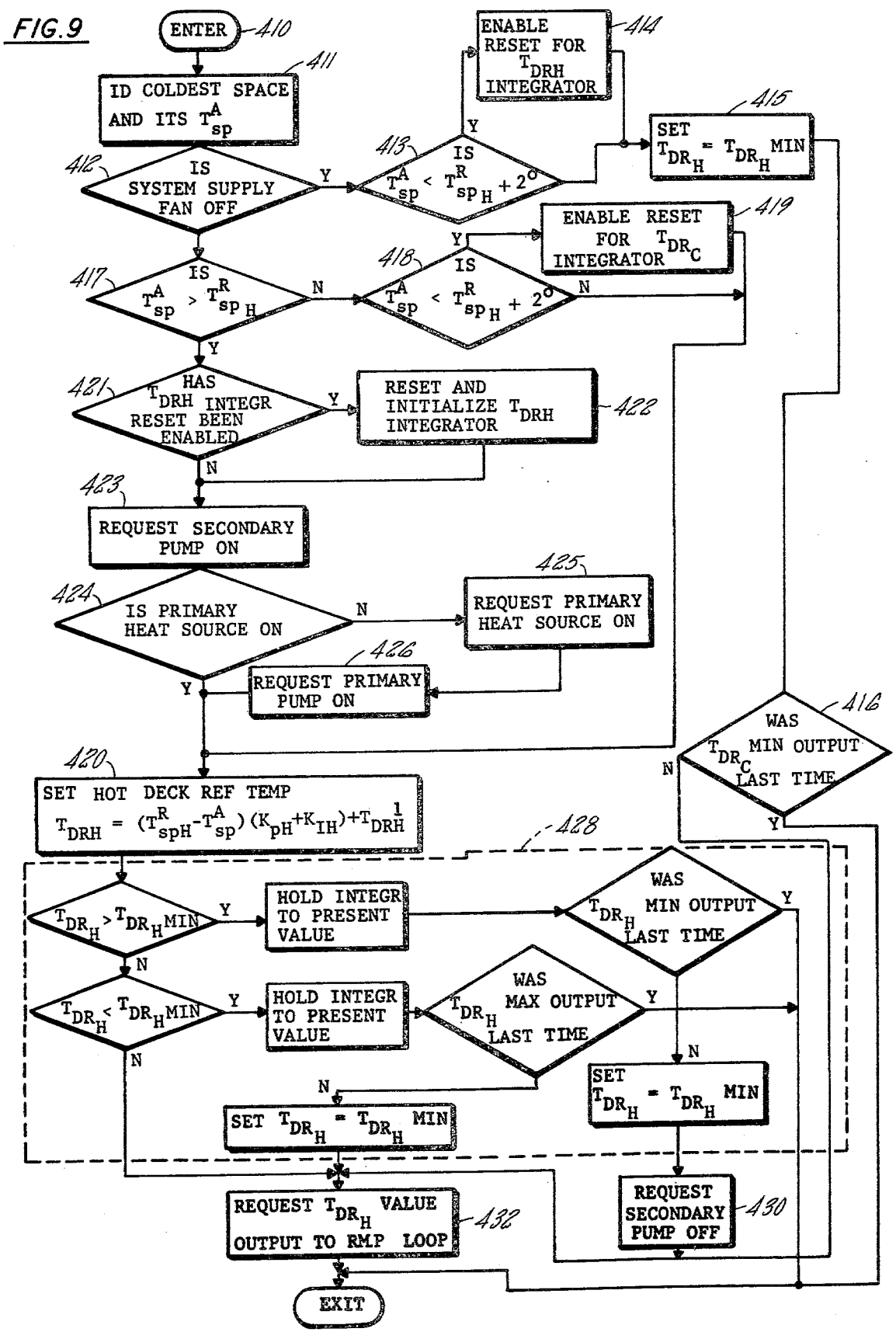
FIG. 9 is a logic flow chart diagram illustrating the processing steps incorporated in still a further control function of the control system of the present invention.

With mechanical heating activated, the heating control loop provided through the CPU and the RMP provides temperature control of the coldest space to the space heat set point value, using the sensed temperature of the hottest space to calculate successive values of the hot deck reference temperature. As with the cooling, mixed air temperature control, and position control of the space dampers, the heating flow chart of FIG. 9 is executed at determined time intervals which are interposed with the execution of the hereinbefore described flow charts of FIGS. 6, 7 and 8. At time $t_{11}$ (FIG. 5, illustration (a)) the sensed temperatures 300–301 are all within the temperature drift band and all are more than two degrees below and above the corresponding cool and heat set point references, such that neither mechanical cooling or heating is provided but the corresponding cold and hot deck discharge integrator resets have been enabled in the flow charts of FIGS. 8, 9. The OAT 304 is less than the sensed temperature of the hottest space 301 and the CPU controls the space temperatures with the mixed air control listing illustrated in the flow chart of FIG. 6, and the space damper control listing illustrated by the flow chart of FIG. 7.

The central HVAC control of the present invention may be used in the control of any type of heating and cooling HVAC system, being readily interfaced into the existing control loops of the HVAC system with the interface apparatus described hereinbefore. Since the CPU executes the flow charts of FIGS. 6–9 autonomously, i.e. each is a separate control function which is dependent only on the selected sensed parameters of the HVAC system itself, such that any one or all of the control functions may be implemented. As stated hereinbefore, the HVAC system of FIG. 1 represents a typical multi-zone type of system wherein the space damper sets 106–108 were physically located in close proximity to the heating and cooling coils such that interfacing with the space damper actuators is practical, allowing central control over the position of the space dampers and further enhancing the overall energy conservation achieved in the HVAC. Another typical type of prior art HVAC system which is substantially identical to the multizone type of system of FIG. 1, but which differs in the manner in which the hot and cold deck discharge air is presented to the spaces, is illustrated in FIG. 11 as a dual-duct type of HVAC. As shown in FIG. 11, the hot and cold decks, return air deck, mixed air input chamber and the associated control loops for each are identical to that of FIG. 1 as are the interface apparatus required for the central control over the mixed air, and heating and cooling control loops. The reference characters of FIG. 11 are identical to those of FIG. 1 for the similar components. The distinguishing feature of the dual-duct system of FIG. 11 is that the temperature controlled spaces 500–502 are each presented with individual duct conduits from the hot deck 23 and cold deck 24, as illustrated by hot duct inputs 23a–23c and cold duct inputs 24a–24c. The hot and cold discharge air to each of the spaces 500–502 is modulated through respective damper sets 504–506 mounted in mixing boxes within each of the respective spaces. Each of the damper sets are driven with actuators 508–510 in response to sensed space errors from thermostats, or zone controllers 512–514 in an identical manner to the prior art space damper positioning of the system of FIG. 1. However, in FIG. 11 the location of the damper sets 504–506 within the spaces 500–502 rather than in close proximity to the heating and cooling coils makes interface with the actuators 508–510 impractical. As a result, the central control over the positioning of the space dampers for the dual-duct type of HVAC system cannot be achieved, however, the control over the mechanical heating and cooling in addition to the mixed air temperature control can be achieved in the same manner described hereinbefore with respect to the flow charts of FIGS. 6, 8 and 9. The interface space sensors 124–126 provide the sensed temperature inputs to the RMP which are used in calculating the mixed air, cold deck, and hot deck discharge temperature reference values as described hereinbefore, and the mechanical heating and cooling is controlled in the same manner using proportional plus integral gain in the calculation of the respective reference temperature values such that the individual control of the space temperatures through the setting of the space thermostats 512–514 is effectively bypassed. In effect, the only disadvantage in the control of the dual-duct system of FIG. 11 is the inability to conserve the amount of hot and cold deck airflow while trying to control the corresponding coldest and hottest space to within the space set point values, otherwise the same degree of energy conservative control is achieved as in the multi-zone type of system.

Similarly, although the invention has been shown and described with respect to exemplary embodiments thereof, it should be understood by those skilled in the art that the foregoing and various other changes, omissions and additions in the form and detail thereof may be made therein and thereto without departing from the spirit and the scope of the invention.

Having thus described typical embodiments of our invention, that which we claim as new and desire to secure by Letters Patent is:

1. Apparatus for controlling an HVAC which provides hot and cold discharge air to a plurality of temperature controlled spaces through associated hot and cold decks connected to an air handler source, each space selecting a portion of the hot and cold air by position modulation of space dampers from a full hot air to a full cold air position in dependence on a selectable reference temperature associated with the space, the air handler including a heating source and cooling source which provide the hot and cold discharge air by conditioning the mixed air discharge from a mixed air source provided as a mixture of outside air and return air from the spaces in a ratio determined by the position of mixed air dampers included therein, the apparatus comprising:

plurality of source temperature sensor means, disposed in the HVAC air handler source, for providing sensed signal information including an actual hot air discharge temperature signal and an actual cold air discharge temperature signal;

plurality of space temperature sensor means, one each disposed in each of the temperature controlled spaces, for providing an actual space temperature signal;

plurality of source control means, including a heating source control means and a cooling source control means, each operatively connected to the associated source and each responsive to actuating gate signals, actual discharge temperature signals and deck reference temperature signals presented thereto, said plurality of source control means each providing a turn on of the source associated therewith in response to the presence of said gate signal, and each providing regulation of the discharge air temperature from the source associated therewith in dependence on the difference temperature between said actual discharge temperature signals and said deck reference temperature signals; and electronic processing means, connected to said plurality of source control means and responsive to said actual space temperature signals, said processing means comparing each of said actual space temperature signals to the lower limit and upper limit of a temperature drift band defined, respectively, by a heat set point temperature signal and a cool set point temperature signal stored in a memory portion of said processing means, said processing means providing to said cooling source control means an actuating gate signal and a cold deck reference temperature signal in response to an actual space temperature above said cool set point temperature and providing to said heating source control means an actuating gate signal and a hot deck reference temperature signal in response to an actual space temperature below said heat set point temperature, said cold deck reference temperature signal and said hot deck reference temperature signal each having a magnitude in dependence on the product of a proportional plus integral gain signal stored in said memory multiplied by an associated one of a space hot temperature error signal and a space cold temperature error signal respectively, said processing means providing said space hot temperature error signal at a magnitude equal to the temperature difference between said cool set point temperature signal and the highest value of said actual space temperature signals above said cool set point, said processing means providing said space cold temperature error signal at a magnitude equal to the temperature difference between said heat set point temperature signal and the lowest value of said actual space temperature signals below said heat set point temperature.

2. Apparatus for controlling an HVAC which provides hot and cold discharge air to a plurality of temperature controlled spaces from an air handler source, each space selecting a portion of the hot and cold air by position modulation of space dampers associated with each from a full hot air to a full cold air position in dependence on a selectable reference temperature associated with the space, the air handler including a heating source and cooling source which provide the hot and cold discharge air by conditioning the mixed air discharge from a mixed air source provided as a mixture of outside air and return air from the spaces in a ratio determined by the position of mixed air dampers included therein, the apparatus comprising:

plurality of space damper control means, one for each of the space dampers, each operatively connected to the associated space dampers to provide positioning thereof from the full hot air position to the full cold air position in response to a space damper position signal presented thereto;

plurality of space temperature sensor means, one each disposed in each of the temperature controlled spaces to provide an actual space temperature signal;

plurality of source control means, including a heating source control means and a cooling source control means, each operatively connected to the associated source and each responsive to actuating gate signals presented thereto for providing a turn on of the associated source in response to the presence of said gate signal; and electronic processing means, connected for response to said plurality of source control means and responsive to said actual space temperature signals for comparing each of said actual space temperature signals to the lower limit and upper limit of a temperature drift band defined, respectively, by a heat set point temperature signal and a cool set point temperature signal stored in a memory portion of said processing means, said processing means providing to said cooling source control means said actuating gate signal in response to an actual space temperature above said cool set point temperature and providing to said heating source control means said actuating gate signal in response to an actual space temperature below said heat set point temperature, said processing means further comparing each of said actual space temperature signals to a space mixed air set point temperature signal stored in said memory, said space mixed air set point temperature signal having a magnitude representative of a temperature value selected from said temperature drift band, said processing means providing said space damper position signals to said space damper control means, in response to said cooling source control means actuating gate signal and said heating source control means actuating gate signal both being concurrently present or both being concurrently absent, each at a magnitude depending on the product of the difference between said space mixed air set point temperature signal and said actual space temperature signal for the particular space, multiplied by a proportional plus integral gain signal stored in said memory.

3. The apparatus of claim 2, wherein said processing means, in the presence of said heating source actuating signal in the absence of said cooling source actuating signal, compares each of said actual space temperature signals to said heat set point temperature signal to provide said space damper position signals to each space at a magnitude in dependence on the product of said proportional plus integral gain signal multiplied by the temperature difference between said actual space temperature for the particular space and said space heat set point temperature, said processing means, in the presence of said cooling source actuating signal in the absence of said heating source actuating signal, comparing each of said actual space temperature signals to said cool set point temperature signal to provide said space damper position signals to each space at a magnitude in dependence on the product of said proportional plus integral gain signal multiplied by the temperature difference between said actual space temperature for the particular space and said cool set point temperature signal.

4. The apparatus of claim 2, wherein:

said plurality of source control means further includes mixed air source control means, operatively connected to the source mixed air dampers, to provide positioning thereof from a full outside air position to a full return air position in response to a mixed air damper position signal presented thereto;

said apparatus further comprises outside air temperature sensor means, for providing an actual outside air temperature signal; and wherein said processing means compares said actual space temperature signals to said actual outside air temperature signal to provide said mixed air damper position signal to said mixed air source control means at a magnitude in dependence on the product of said proportional plus integral gain signal multiplied by the temperature difference between the hottest of said actual space temperature signals and said space mixed air set point temperature signal in response to said outside air temperature signal having a lower temperature value than the hottest of said actual space temperature signals, said processing means providing said mixed air damper position signal at a magnitude representative of a full return air position for the mixed air dampers in response to said actual outside air temperature signal having a temperature value higher than that of the hottest of said actual space temperature signals.

5. The apparatus of claim 4, further comprising means responsive to operator control for providing to said memory of said processing means, parameter signals representative of said heat set point temperature signal, said cool set point temperature signal, said proportional plus integral gain signal, and said space mixed air set point temperature signal in response to selective operation thereof.

6. The apparatus of claim 4, further comprising:
return air temperature sensor means for providing sensed signal information representative of the actual temperature of the return air from the spaces;
relative humidity sensor means, including a return air relative humidity sensor adapted to be disposed in the HVAC air handler source for providing sensed signal information representative of the relative humidity of the return air from the spaces, and an outside air relative humidity sensor for providing sensed signal information representative of the outside air relative humidity; and wherein
said processing means in response to said sensed signals representative of the outside air temperature and relative humidity and the return air temperature and relative humidity, provides signals representative of the actual outside air enthalpy and the actual return air enthalpy, said processing means providing said mixed air damper position reference signal at a magnitude in dependence on the temperature difference between the hottest of said actual space temperature signals and said space mixed air set point temperature signal in response to the simultaneous conditions of said actual outside air temperature signal at a temperature value less than the hottest of said actual space temperature signals in the presence of an actual outside air enthalpy which is less than the actual return air enthalpy, said processing means providing said mixed air damper position signal at the full return air position magnitude at all of the times.

* * * * *